US00RE39286E

(19) United States
(12) Reissued Patent
Silver et al.

(10) Patent Number: US RE39,286 E
(45) Date of Reissued Patent: Sep. 19, 2006

(54) MULTI-BLADE CUTTING DEVICE

(75) Inventors: Michael I. Silver, New York, NY (US); Wendy L. Silver, New York, NY (US); Eric Chan, New York, NY (US); Rama Chorpash, New York, NY (US); Ira Spool, New York, NY (US)

(73) Assignee: Wenco, L.L.C., Mount Kisco, NY (US)

(21) Appl. No.: 10/408,308

(22) Filed: Apr. 8, 2003

Related U.S. Patent Documents

Reissue of:
(64) Patent No.: 6,453,560
Issued: Sep. 24, 2002
Appl. No.: 09/824,786
Filed: Apr. 4, 2001

U.S. Applications:
(60) Provisional application No. 60/194,372, filed on Apr. 4, 2000.

(51) Int. Cl.
*B26B 13/06* (2006.01)

(52) U.S. Cl. ..... 30/134; 30/142; 30/258
(58) Field of Classification Search ..... 30/134, 30/258, 254, 223, 260, 304, 150, 149, 142, 30/148, 147, 131; D7/643
See application file for complete search history.

(56) References Cited

U.S. PATENT DOCUMENTS

| | | | | | |
|---|---|---|---|---|---|
| 550,483 | A | * | 11/1895 | Carrier | |
| 834,601 | A | * | 10/1906 | Woernle | 30/142 |
| 845,644 | A | * | 2/1907 | Hultquist | |
| 1,012,918 | A | * | 12/1911 | Roelants et al. | |
| 1,345,882 | A | * | 7/1920 | Repass | |
| 1,368,431 | A | * | 2/1921 | Greenberg | |
| 1,551,057 | A | * | 8/1925 | Robinson | 56/331 |
| 1,715,898 | A | * | 6/1929 | Carri | |
| D119,038 | S | * | 2/1940 | Guild | |
| 2,272,580 | A | * | 2/1942 | Phillips | |
| 2,468,563 | A | * | 4/1949 | Legare | |
| D171,837 | S | * | 3/1954 | Blanchaert | |
| 2,840,905 | A | * | 1/1958 | Geiger | |
| 2,839,830 | A | * | 6/1958 | Neiman | 30/147 |
| D244,828 | S | * | 6/1977 | Visco | |
| D246,223 | S | * | 11/1977 | Hayashi | |
| D248,534 | S | * | 7/1978 | Backstrom et al. | |
| D250,246 | S | * | 11/1978 | Spigelman | |
| D256,215 | S | * | 8/1980 | Chen | |
| D264,677 | S | * | 6/1982 | Perry, Jr. | |
| 4,393,588 | A | * | 7/1983 | Kowalski | |
| D278,117 | S | * | 3/1985 | Smith | |
| D316,802 | S | * | 5/1991 | Yamagishi | |
| D331,179 | S | * | 11/1992 | Omichi | |
| 5,600,891 | A | * | 2/1997 | Orgal | |

FOREIGN PATENT DOCUMENTS

| | | | |
|---|---|---|---|
| DE | 297 04 958 | * | 5/1997 |
| EP | 0 846 832 | * | 6/1998 |
| FR | 2 059 178 | * | 5/1971 |
| GB | 948 337 | * | 1/1964 |

* cited by examiner

*Primary Examiner*—Douglas D Watts
(74) *Attorney, Agent, or Firm*—Fitzpatrick, Cella, Harper & Scinto

(57) ABSTRACT

A cutting device especially designed for cutting up salad greens includes two blades, a rib and handles. The two blades are inter-secured to rotate together about a common axis, but are spaced apart from each other along the common axis. The rib is pivotably secured to the two blades so as to rotate about the common axis, and is curved in a direction of rotation so as to have a concave surface. The handles are integrated with the two blades and the rib to control the two blades and the rib to rotate simultaneously between open and closed positions. The concave surface of the rib is the lead surface when moving from the open position to the closed position, and the cutting edges of the two blades cross edges of the concave surface when moving from the open position to the closed position, so as to perform a cutting action.

51 Claims, 14 Drawing Sheets

MULTI-BLADE CUTTING DEVICE

Matter enclosed in heavy brackets [ ] appears in the original patent but forms no part of this reissue specification; matter printed in italics indicates the additions made by reissue.

This application claims the benefit of provisional Application No. 60/194,372, filed Apr. 4, 2001.

The present invention relates to a multi-blade (multi-scissor) cutting/chopping device with specially curved members that make it useful in preparing and serving food.

BACKGROUND AND SUMMARY OF THE INVENTION

When preparing and serving food, particularly salads and the like, it often is necessary to cut up (and/or chop) and serve the food from a bowl. Although there are conventional service utensils for serving food from a bowl, conventional knives and scissors are not well adapted for performing cutting in such a restricted environment. Specifically, the shape of traditional blades does not allow for easy maneuvering in the parabolic environment of a bowl. In addition, the curved sides of a bowl, as well as the materials of which a typical bowl is constructed, do not provide an ideal cutting surface for conventional blades.

The present invention addresses this problem by providing a cutting device with features that are particularly well suited for both cutting and serving food from a bowl, or other similar restricted environment. In particular, the kitchen shears of the present invention can have features such as one or more specially curved blades, curved ribs with cutting edges, and wing attachments for the blades and/or ribs, that allow for the scooping up of food in a bowl. Once scooped up by the device, one or more opposing blades can be put into motion, so as to cross the curved blade(s) and/or ribs, and cut the food. Thus, the present invention provides a way to scoop up food in a bowl that would otherwise be difficult to handle with a conventional knife, and support the food while the chopping of it is easily performed. Also, the chopping is easily performed regardless of the bowl's surface materials, since the device provides its own cutting surface. This makes cutting easier and protects the surface of the bowl.

DETAILED DESCRIPTION OF THE INVENTION

The device of the invention includes two units connected so as to rotate about a common axis (or at least parallel axes) and work in gang fashion. In a main embodiment, the first unit (scooping unit) includes one or more ribs and/or one or more blades. The ribs may have cutting edges along either, but preferably both, of their sides (the cutting edges may be provided by providing ribs with blades secured to opposing sides thereof). The ribs and/or blades of the first unit are curved in their planes of rotation so as to have a convex cutting edges opposing the second unit, and serve as a platform upon which chopping/cutting is performed. In addition, prongs/wings may extend from the blades or ribs of the first unit to help scoop and hold food, preferably so as to be cut. The prongs/wings may be curved in directions in their planes of rotation or perpendicular to their planes of rotation. Alternatively, the scooping unit may have a spatula-like form (curved or flat), with the spatula-like scooping unit having an edge, preferably formed on its scooping surface, against which cutting may be performed. Thus, the scooping unit may also provide a cutting or chopping platform that is well suited for environments other than a bowl.

The second unit (cutting unit) includes one or more blades, but preferably two blades, that may also be curved in their respective planes of rotation. The blades are positioned so as to interact with the side edges of the ribs or opposing blades of the scooping unit to perform cutting when rotated in their planes of rotation from an open position to a closed position, much like parallel pairs of scissors. Thus, the corresponding cutting edges of the different units may have substantially common planes of rotation.

The device provides particular benefits when trying to cut salad greens and the like, while held in a bowl. The curvature of the scooping unit allows the device to reach, scoop, support and cut/chop the contents of a bowl easily. In addition, the design of the ribs and/or blades, as well as the prongs/wings, enables the scooping unit easily to scoop up food, and either support the food during the cutting process or serve the food already cut.

In one embodiment, the present invention relates to a cutting device including two blades inter-secured to rotate together about a common axis and spaced apart from each other along the common axis. The device also includes a rib pivotably secured to the two blades so as to rotate about an axis that is one of parallel with or the same as the common axis, with the rib being curved in a direction of rotation so as to have a concave surface. In addition, handles are integrated with the two blades and the rib to control the two blades and the rib to rotate simultaneously between opened and closed positions. The concave surface of the rib is the lead surface when moving from the open position to the closed position, and cutting edges of the two blades cross opposing edges along the length of the concave surface when moving from the open position to the closed position so as to perform cutting against the cutting edges.

In another embodiment of the present invention, the cutting device includes a plurality of pairs of blades pivotably inter-secured to rotate about common or parallel axes, each one of the pairs of blades including a first blade and a second blade having substantially common planes of rotation. The first blades are curved in their respective planes of rotation to have concave cutting edges. The cutting device also includes a pair of wings secured to the device so as to rotate with the first blades, with the wings extending in substantially opposite directions from different outermost first blades along an axis of rotation. In addition, two handles are integrated with the plurality of pairs of blades to control the first and second blades of each one of the plurality of pairs of blades to simultaneously rotate between opened and closed positions. The concave cutting edges of the first blades are lead edges as the plurality of pairs of blades are rotated from the open to closed position.

In yet another embodiment, the present invention is directed to a cutting device having a blade secured to the device so as to rotate about an axis and a scoop secured to the device so as to rotate about an axis one of parallel with or the same as the axis of rotation of the blade. The scoop has a cutting edge formed thereon. Handles are integrated with the blade and the scoop to control the blade and the scoop, including the cutting edge, to simultaneously rotate between open and closed positions. The cutting edge of the scoop is a lead edge when moving from the open position to the closed position, and the cutting edge and the blade cross so as to perform a cutting action when moving from the open position to the closed position.

In another embodiment, the present invention is directed to a multi-scissor apparatus including a plurality of pairs of blades pivotably inter-secured to rotate about a common axis, with each one of the plurality of pairs of blades including a first blade and a second blade. The blades of each pair are curved in opposite directions in their substantially common planes of rotation to have opposing concave edges, and each of the first and second blades including a first cutting edge on the concave edge thereof. Two handles are integrated with the plurality of pairs of blades to control the first and second blades of each one of the plurality of pairs of blades to simultaneously rotate between open and closed positions. When moving from the open position to the closed position, the concave edge of each of the first and second blades is a leading edge in the direction of rotation.

Cutting Unit

For purposes of description, the blades of the present invention primarily used for cutting, i.e., the blades described above that are referred to as the second blades and the blades opposing the rib or wings, and the handle controlling those blades, are referred to as the cutting unit. The blades of the cutting unit may be of a variety of conventional designs, but preferably, the blades are curved in their planes of rotation, from points near their axis of rotation outward.

Preferably, the blades are mounted so as to rotate about a common axis. The blades may be spaced along the common axis as necessary, but are preferable spaced apart about 0.7 to about 2.5 cm.

One or more blades may be used in the cutting unit to perform cutting. But, with the preferred rib configuration in the scooping unit (described below), even numbers of blades are preferred. In most preferred embodiments, two blades are provided. The following description of the cutting unit generally corresponds to an embodiment with two blades.

The blades form the cutting unit along with a handle, with the blades and handle, or at least main portions thereof, being preferably positioned on opposite sides of the axis of rotation. The pair of blades may connect with each other, and with the handle, on either side of the axis of rotation, so as to work as a single unit. The cutting unit may be formed of molded plastic (preferably a single piece), such as ABS (acrylonitrile butadiene styrene), polypropylene, nylon, glass filled nylon, glass filled polypropylene and the like. Of course, the cutting surface of the blades or blades as a whole are preferably formed of metal, such as stainless steel. However, the cutting edges or blades as a whole may be ceramic or plastic, and the handle may be made of stainless steel, or other metal.

The blades and handle may be secured to each other by any conventional means. For instance, the blades may be screwed or bolted to the handle, locked together with the handle by a male/female mating mechanisms, formed by injection molding, glued, etc.

Most preferably, a stainless steel edge is used for the cutting surface of the blade, with the stainless steel edge extending for approximately 7 to approximately 11 cm. along the length of each of the blades. The length of the blades from the axis of rotation to the tip is preferably in the range of about 7.5 to 15 cm. The radius of curvature of the blades at the most severe curve of the blade is preferably in the range of about 30 to 90 degrees. (The blades may be curved in their planes of rotation, in either direction, as discussed below in more detail.)

The cutting surface for each blade is preferably provided on the outside edge of each blade, with respect to the position of the other blade(s). The cutting surfaces of the blades may also have serrated edges along their entire lengths, or portions thereof. Preferably, the cutting edge is a beveled edge such as is provided on a knife or the blades of scissors. With the cutting edges of adjacent blades being provided on outside surfaces thereof, those adjacent blades can cut against opposing sides of a rib. Accordingly, the cutting of each blade is one directional, cutting away from the rib. This type of cutting mimics that of a paper cutter, in which the material to be cut is cut away from the object on which it is supported. This is different than the cutting action of scissors, in which opposing blades force the cut material in opposite directions. One directional cutting is beneficial in that it reduces the likelihood of jamming of the device. Of course, when opposing blades are used in place of a rib, scissor-like cutting may be performed.

Preferably, the distance between the blades of the cutting unit varies along different respective positions on the blades. More specifically, in a cutting unit with two blades, the distance between the blades along equal relative positions of the cutting edges thereof is preferably smaller than distances between the blades at equal relative positions closer to the edges opposite the cutting edges. Most preferably, the distance between the blades increases from the cutting edges to the opposite edges. Accordingly, it is preferred that the variation in distances between equal relative positions along adjacent blades vary by position in a range of 0.3 to about 0.6 cm.

Accordingly, as a piece of food is cut by the cutting edges rotating in their planes of rotation, and is forced past the cutting edges (for instance, by a rib) to the opposites edges of the blades, additional space is provided between the blades so that the cut piece of food does not become lodged between the two blades. It is preferred that this difference in distance is formed by providing a slope or curvature in opposing side faces of adjacent blades, at least along cutting portions of the blades.

Scooping Unit

The scooping unit is preferably made up of another handle along with one or more ribs and/or blades that are curved in their planes of rotation, from points near their axis of rotation outward, to allow for scooping. The scooping unit is also the portion of the device typically including the prongs/wings, when such features are provided. In other embodiments, the scooping unit may be provided with a flat or curved spatula-like attachment (scoop), with a cutting edge formed thereon, instead of a rib or blades. Other such variations may be provided as long as the scooping unit is able to scoop up and support food during cutting or chopping.

The blades of the cutting unit cut against either the blades of the scooping unit, cutting edge of the scoop or the side edges of the rib, with the cutting edges of the blades of the cutting unit crossing the cutting edges or blades of the scooping unit (preferably in substantially common planes of rotation) as the two units are moved from an open position to a closed position.

Whether to use a rib, blades, scoop or a combination thereof in the scooping unit is a matter of design choice. Also, the number of ribs or blades may be varied depending on the particular design. Preferably, one rib, one scoop, and/or two blades are provided. In that regard, the blades of the scooping unit may be secured to or part of the rib or scoop in certain embodiments.

The rib is a rib-shaped member extending out from the axis of rotation, with the handle generally being located on an opposite side of the axis of rotation. The rib is curved in its plane of rotation so as to have a concave surface that is a leading surface of the rib as the cutting device is moved from the open position to the closed position. Accordingly, food is cradled by the rib as it is cut by the action of the rib and blades of the cutting unit.

The width of the rib in its plane of rotation may be tapered such that the rib is thinner at its tip and is thicker closer to its axis of rotation.

The rib preferably includes cutting edges (defining the lateral edges of the concave face) on its sides that are positioned such that the opposing blades slice against the cutting edges to perform cutting when the cutting device is moved from an open to a closed position. (However, in alternative embodiments, the cutting edges of the scooping unit may be positioned on the wings/prongs, with the blades performing cutting by interaction with the prongs instead of the rib.) The cutting edges of the rib are preferably square with the concave surface of the rib (i.e., forming a 90° angle), but may be beveled or otherwise connected.

The cutting edges are preferably formed of stainless steel edges attached to the sides of the rib. However, any conventional cutting edge may be used, and plastics or ceramics may be used to form the edges.

To enhance the gripping action of the invention, the concave surface of the rib facing the blades of the cutting unit may be textured so as to prevent food from sliding during cutting. This may include raised ridges formed on the concave surface of the rib. Preferably, the ridges extend in directions substantially perpendicular to the plane of rotation of the rib. The ridges may also be tapered on one side (preferably, the far side from the axis of rotation) so as to allow food to be more easily scooped into the scooping unit, but not to fall out of the unit easily.

In alternative designs, the ribs may include a raised spacer on the upper surface thereof, which food items such as carrots or cucumbers may butt against during cutting. By doing so, the item may be sliced by one blade of the cutting unit and one corresponding edge of the rib, and then repositioned against the spacer for another slice. By repeating this process, similarly sized slices can easily be replicated.

The rib preferably acts as brace/support for food, against which the cutting force of the blades is applied. As discussed above, such cutting action is different from that of typical scissor devices, in which an item is forced away from criss-crossing blades in two directions, i.e., forced to the outside of each blade. Using the rib, a portion of the item being cut is supported by the rib, while a second portion may be forced away from the rib in a single direction, i.e., to the outside of the blade's cutting edge, with respect to each blade.

However, alternative designs may be used in which a scissor-like cutting is employed. For instance, in place of the rib, the scooping unit may include two blades that are positioned in opposition to the blades of the cutting unit so that the two units work in gang fashion to cut similarly to two pairs of scissors (i.e., corresponding blades of the two units have substantially common planes of rotation). In such an embodiment, the blades are formed as discussed above with respect to the blades of cutting unit or edges of the rib.

When blades are used in place of, or in conjunction with, the rib, the blades are preferably curved in their respective planes of rotation, similarly to the rib. Accordingly, the blades of the scooping unit have concave cutting edges that are the lead edges as the cutting device is moved from the open position to the closed position.

The blades of the scooping unit may also have curved or sloped internal sides, as described above with respect to the blades of the cutting unit. Accordingly, food will be less likely to become wedged between the blades of the scooping unit. In addition, when blades are used in the scooping unit, the blades may cross the blades of the cutting unit (as viewed in directions perpendicular to the planes of rotation) on inside or outside positions of the blades of the cutting unit, depending on the design.

The number of blades or ribs used in the scooping unit may be varied, but preferably, the number of ribs or blades in the scooping unit should compliment the number of blades in the cutting unit, so that the two units effectively work together. The width of the rib is preferably in the range of about 1.25–3.75 cm. Also, the rib and blades of the scooping unit preferably have lengths from the axis point to each tip in the range of about 12.5–17.5 cm.

The blades of the cutting unit may also be curved in their respective planes of rotation. In preferred designs, the blades of the cutting unit are curved in the same direction as the rib and/or blades of the scooping unit. However, in other embodiments, the blades of the cutting unit may be curved in a direction opposite to the rib and/or opposing blades.

The Prongs/Wings

The prongs/wings are preferably attached to the rib or blades of the scooping unit on a side of the axis of rotation opposite the handle. However, the wings do not have to attach directly to the blades or rib, and may be secured to the device in any one of a number of conventional ways such that the wings rotate along with the ribs or blades of the scooping unit.

The wings may extend from the rib or blades at a point in the middle to lower portions of the widths (in the plane of rotation) of the rib or blades. When extending from the ribs, it is preferred that the wings extend from opposing sides of the rib (or outermost ribs when more than one rib is used) in directions substantially perpendicular to the plane of rotation. When extending from the blades of the scooping unit, it is preferred that the wings extend from opposing sides of the outermost blades (along the axis of rotation) in directions substantially perpendicular to the plane of rotation. Preferably, the wings extend out from along the rib or blades for a length of approximately 3.5 to approximately 9 cm. In addition, it is preferred that the wings have a width (measured in a direction perpendicular to the plane of rotation) in the range of about 0.7 to about 4 cm.

Like the rib and blades of the scooping unit, the wings are preferably curved in their respective planes of rotation. The wings help scoop food, along with the rib and/or blades, in order to serve the food or to support the food in place during cutting. In that regard, the wings may mimic the shapes of the sides of spoons or curved spatulas. In other embodiments, the wings may be flat, so as to function as a traditional spatula.

The wings also may be curved in transverse directions, with respect to their main lengths (i.e., in directions substantially perpendicular to the plane of rotation of the rib or blades). The curvature of a wing in the transverse direction may be such that the edge of the wing closest to the rib or blade is closer to the edge of the rib or blade opposite the cutting edge, and the wing curves or slopes such that the outside edge is closer to or extends past the cutting edge of the rib or blades of the scooping unit. Thus, the wing may mimic the transverse curvature of a spoon. The transverse curvature of the wings causes food scooped up in the scooping unit to fall toward the rib and/or blades, and thus toward the cutting edges to be cut. This shape is also preferable for more effectively scooping and holding food.

Like the rib, the wings may also have textured surfaces to prevent food from sliding out of the scooping unit. In preferred embodiments, the wings have grooves formed therein. However, the texture may be similar to that discussed above with respect to the rib.

Preferably, the wings are integrally formed with the rib or blades, or firmly secured thereto.

In some embodiments, there may be provided a space between portions of the wings and rib or blades. Preferably, the space is provided at a position along the rib or blades farthest from the axis of rotation. The space may extend for approximately 1.25 to approximately 5 cm, from the tip of the rib or blades toward the axis of rotation. In this case, the tips of the blades from the cutting unit may pass between the wings and rib or blades (as viewed in a direction perpendicular to the plane of rotation) as they travel to the fully closed position, coming to rest in the space. Preferably, the width of the space is in the range of about 0.3 to 1.0 cm.

In other embodiments, the space may be more pronounced such that the wings more resemble prongs or the tines of a fork. In this case, it is preferred that the prongs/wings extend from the rib or blades in a direction perpendicular to the plane of rotation for approximately 1 to approximately 2 cm, at which point there may be an L-shaped bend in each prong. A main length of each prong should extend from the L-shaped bend away from the axis point, in a direction substantially parallel to the rib or blade. The distance from the L-shaped bend to the tip of the prongs is preferably in the range of about 5–15 cm. With the prongs attached as described above, the scooping unit resembles a large fork, with the prongs and ribs or blades forming the tines thereof.

Also, with the main length of each prong being substantially parallel to the rib or blades, each prong may be spaced from the rib or blades substantially evenly for a distance in the range of about 1–2 cm along the main length, to allow the blades to cross the rib or blades during cutting without interference. The spacing of the prongs from the rib or blades can vary among different designs, so as to trap and cut, or to allow to fall through, differently sized pieces of food (i.e., nuts and the like).

In alternative embodiments, the prongs may attach to the rib or blades at a far end thereof, with respect to the axis of rotation. With such a design, the L-shaped bend of each prong turns in a direction opposite to that described above. Also, the main length of each prong extends from the L-shaped bend toward the axis point. In this design, it is preferable that the lengths of the blades of the cutting unit are such that the distances from the axis point to the tips of the blades are shorter than the distances from the axis point to the L-shaped bends in the prongs. Thus, the blades of the cutting unit are short enough that they can pass between the prongs and rib or blades of the scooping unit without butting against the L-shaped bends of the prongs.

However, the blades of the cutting unit do not have to pass between the wings/prongs and the rib or blades to complete the cutting action. Preferably, the wings attach to the rib or blades at portions thereof in the middle to lower part of the width of the rib or blades (i.e., away from the cutting edges). By attaching at a position in the middle to lower portion of the width of the rib or blades, the wing connections will provide more room for the blades to cross the cutting edges of the rib or blades during cutting. Thus, the blades of the cutting unit can perform cutting against the cutting edges of the rib or blades of the scooping unit before reaching a position from which the wings extend out from the rib or blades.

Handles

The handles may be in the form of any conventional scissor-type handles. Preferably, the operation of each handle controls the movement of the cutting unit and scooping unit, respectively, to produce the cutting action.

Each handle may include an opening therethrough for a user's fingers. Preferably, the opening should extend in a direction substantially parallel to the axis of rotation of the blades. The opening may be formed in a variety of shapes, including rectangular, circular, oval, elliptical, semi-circular or the like. The openings may also include indentations positioned along the sides of the inner walls corresponding to the edge opposite the cutting edge of the blade or rib. The indentations preferably are formed to cradle individual fingers of the user when operating the device. Typically, a plurality of fingers fit inside the opening of one handle and the thumb fits inside the other. Accordingly, the openings may be sized differently to accommodate these distinct purposes.

In a more preferred embodiment, there are provided one loop-type handle (preferably attached to the cutting unit), as described above, and one paddle-shaped handle (preferably as part of the scooping unit). In this embodiment, the user's fingers fit inside the loop-type handle and the user's palm rests on the paddle-shaped handle. The paddle-shaped handle may be rounded to conform to the user's palm. By squeezing the handles together, the user can close the device and perform cutting. This design is shown in the accompanying figures.

In this design, it is preferable to have a spring mechanism (such as a compression spring) attached to the multi-scissor cutting device. The spring mechanism [(not shown in the figures)] biases the device to an open position wherein the blades of the cutting unit and the rib (or opposing blades) are spaced apart from each other. Thus, once cutting is performed by squeezing the handles, the user may simply release the squeezing pressure to allow the device to open on its own. Any conventional spring mechanism may be used. However, preferably, the spring is connected between the cutting unit at a position on the handle side of the axis of rotation, and the scooping unit at a position on the scooping side of the axis of rotation. Most preferably, the spring mechanism includes a conventional locking feature that may be used by the user to lock the cutting device in the closed position for easy and safe storage.

In addition, the handles may be designed such that portions thereof abut to halt the movement of the blades and ribs, defining the closed position of the cutting device. This may allow the device to reduce or prevent pressure on the wings that may be caused by the movement of the blades of the cutting unit.

Interconnection of the Blades

The plurality of blades, ribs and wings are selectively interconnected in gang fashion to work in unison, with the above-discussed members rotating about a common axis, or at least parallel axes. The different units may be connected by any conventional means. However, it is preferable to provide a nut-and-bolt arrangement that secures the two units together, and also serves as the axis of rotation. Of course, other fastening means may be used. For instance, the blades may be attached to each other at their pivot point by a pinion, axle, screw, hinge or the like. In addition, the blades of the present invention may be attached by a 90° male/female quick release hinge. The 90° male/female hinge normally includes an oblong head, having an undersurface parallel to the plane of rotation, that is held by a narrower neck or stem portion to one blade at the pivot point.

Alternative Embodiments

Although the present invention is most preferably practiced using variations and combinations of the above-discussed designs, alternative embodiments are possible that also provide the benefits of the present invention.

In one alternative embodiment, the cutting device may have only one blade in the cutting unit (first blade), which is secured to the device so as to rotate about an axis. In addition, the scooping unit may simply include a scoop secured to the device so as to rotate about an axis that is either parallel with or the same as the axis of rotation of the first blade. The scoop preferably has a concave or sloped scooping surface opposing a cutting edge of the first blade, such that the scoop resembles a spoon. However, the scoop may be flat, resembling a spatula. A second blade, or other such protruding edge, may be mounted on the scooping surface of the scoop, with the second blade or edge preferably having a concave cutting edge. The concave cutting edge of the second blade is a lead surface when moving from the open position to the closed position of the device, and the cutting edges of the first blade and the second blade or edge cross so as to perform cutting when moving from the open position to the closed position. Accordingly, this design variation provides a single pair of cutting edges to perform cutting. Of course, a plurality of cutting edges may also be provided.

This design is similar to the designs described above in that it basically includes the wings and rib integrated to form a single scoop and has just one blade in the cutting unit. Accordingly, most of the features are similar to the those described above, and are not repeated herein. However, in this embodiment the feature corresponding to the rib is preferably just a raised portion of the scooping surface that provides a cutting edge.

In embodiments where the scoop has a flat surface, or a partially flat surface, the device can be used to support and cut alternate types of foods, such as pieces of a torte or pizza.

In yet another design, the benefits of the present invention may also be obtained from a more basic embodiment of the invention employing a plurality of opposing blades, instead of using ribs and wings. In this embodiment, the device includes pairs of blades spaced along a common axis (or at least parallel axes) of rotation to work in gang fashion, with each blade preferably being curved in its plane of rotation. Each pair of blades includes a first blade and a second blade, with the first blades corresponding to the scooping unit. Accordingly, the first blades are curved in their planes of rotation to have a concave leading edge when moving from the open to closed position. Also, in this embodiment the second blades preferably are curved in their planes of rotation in direction opposite to the direction of curvature of the first blades. Thus, the curvature of the blades is adapted to mimic the shape of a bowl, so that the opposing curvatures of the blades work together to scoop food.

When in the closed position, adjacent, inner sides of the blades of a pair may abut each other. But even if the inner sides of the blades only come into close proximity with each other, adequate cutting ability may still be provided. When moving from an open to a closed position, the inner sides of the blades come into contact with each other at edges thereof (or, if the inner sides are only in close proximity with each other, overlap when viewed in a direction parallel with the axis of rotation of the blades), preferably beginning at a position closest to the pivot point and continuing to the tip, as the blades close. In this manner, the edges crisscross each other to produce a cutting action that progresses along the length of the blades. The crisscrossing can begin at two points along each blade and proceed along the slopes of the curves, toward each other, as the blades close.

Pressure for the cutting action may be provided along the cutting edges in a number of ways. Commonly, the blades bow slightly away from each other. In a conventional pair of scissors this can be most easily seen when the scissors are in the closed position; often there is a gap between them, intermediate their length, when the tips are pressing against each other.

Alternatively, the inner sides of the blades can have planar surfaces slightly diagonal to the plane of rotation, such that an inner surface slopes from one longitudinal edge of the blade to the other. In this configuration, the inner surface of each blade preferably slopes away from the opposing blade surface in the direction from the longitudinal edge that includes the cutting edge, towards the opposite edge. The angle formed between the plane of the inner surface of a blade and the plane of rotation, as viewed down its length, usually mirrors that of the opposite blade.

The outer side of each blade may be flat or sloped (in a width-wise or length-wise direction). The distance between the two sides (the blade thickness) preferably will be about 0.156 to 0.313 cm.

The inner and outer sides of each blade are preferably connected to each other by longitudinal transitional edges. Preferably the two transitional edges will meet at the tip of the blade. Each edge may be flat, beveled, or rounded. Preferably, the edge that cuts is beveled. If beveled, the transitional edge may advantageously be formed of two longitudinal strips, or "flats," and preferably one strip will be wider than the other. In that case, it is preferred that the narrower strip be adjacent the inner side of the blade e.g., the cutting side.

If the transitional edge instead is flat, it may, for example, form substantially a right angle with each of the inner and outer sides of the blade. The right angle between the cutting edge and the inner side still provides a cutting edge, but the blade itself is not as sharp and, thus, is generally safer.

Of course, the blade designs in this embodiment may also be employed in other embodiments of the invention, along with many other conventional blade designs used for scissors, knifes, or the like.

In addition, in this embodiment, the convex edge of each blade may also include a cutting edge adapted to cut as the blades are moved from the closed position to the open position. This cutting arrangement is particularly useful for cutting foods that may remain at the bottom of the bowl that are not scooped and cut during the closing of the blades. The convex cutting edges may also be used for dicing and chopping foods, such as on a cutting board, for instance.

DETAILED DESCRIPTION OF PREFERRED EMBODIMENTS

DESCRIPTION OF THE DRAWINGS

The accompanying drawings show some preferred embodiments of the present invention.

DISCUSSION OF DIFFERENT DEPICTED EMBODIMENTS

Figure 1:
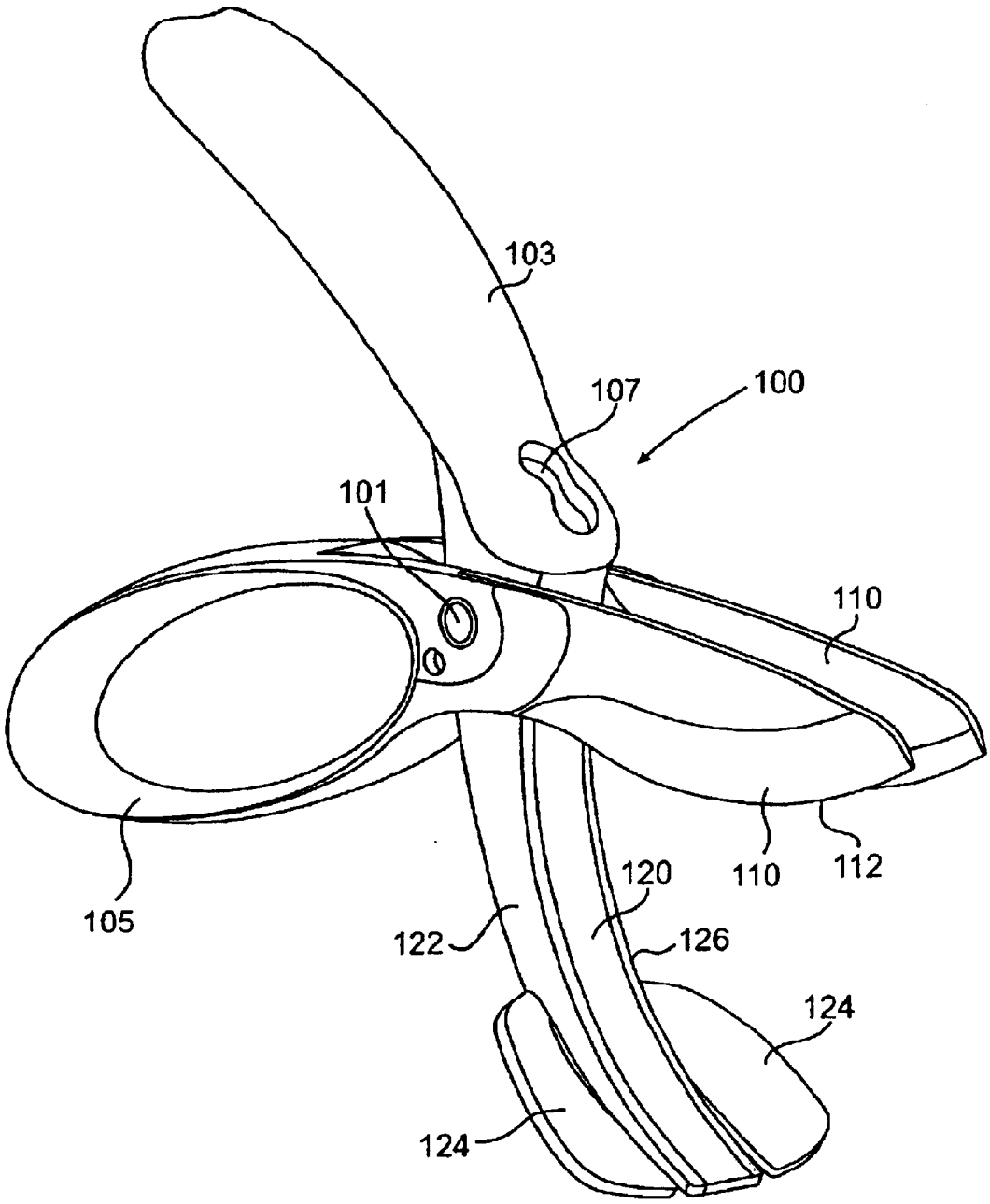
FIG. 1 is a perspective view of one embodiment of a cutting device according to the present invention, in an open position.

FIGS. 1–5 show one design of the present invention. In particular, FIGS. 1–5 show a cutting device 100. The cutting device 100 includes a cutting unit having cutting blades 110 and handle 105. The cutting device 100 also includes a scooping unit having rib 120, scooping blades 122, wings 124 and handle 103. Both the cutting and scooping units rotate about a common axis defined by pin 101. Accordingly, moving handle 103 causes rib 120 (as well as scooping blades 122 and wing 124) to rotate about the axis, and moving handle 105 causes cutting blades 110 to rotate about the axis.

Cutting blades 110 include cutting edges 112 that extend from cutting blades 110 substantially in the plane of rotation of cutting blades 110. The cutting edges 112 are convex in shape and oppose rib 120 in their respective planes of rotation.

Figure 2:
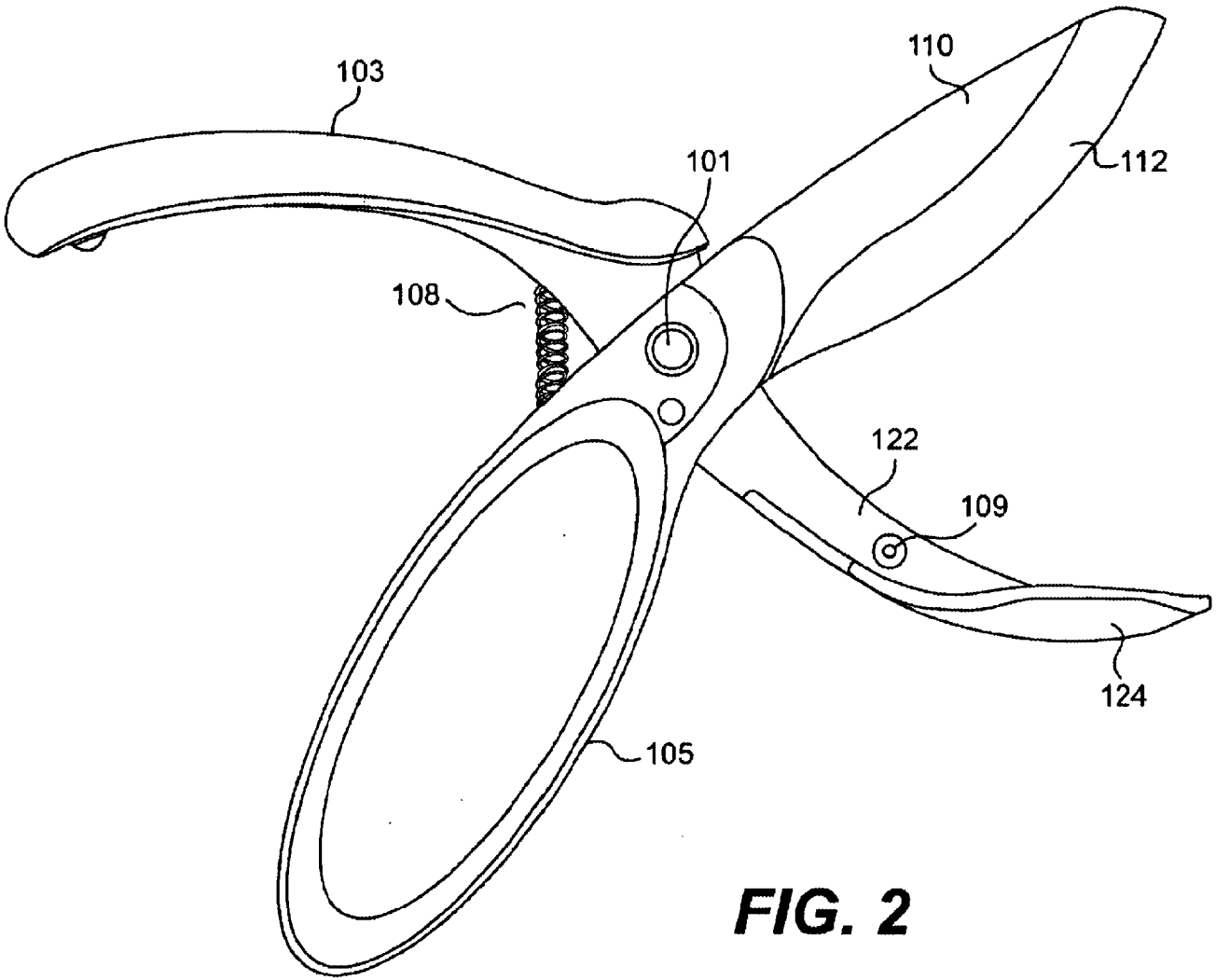
FIG. 2 is a side view of the cutting device shown in FIG. 1, in an open position.

As shown in FIG. 2, a screw 109 secures the scooping blades 122 to opposing sides of rib 120. As shown in FIG. 1, the scooping blades 122 include cutting edges 126, which are leading edges as rib 120 and scooping blades 122 are rotated toward cutting blades 110. Cutting edges 126 are concave in shape. In addition the leading surface of rib 120, as rib 120 is rotated toward blades 110, is concave, having the same radius of curvature as cutting edges 126.

Figure 5:
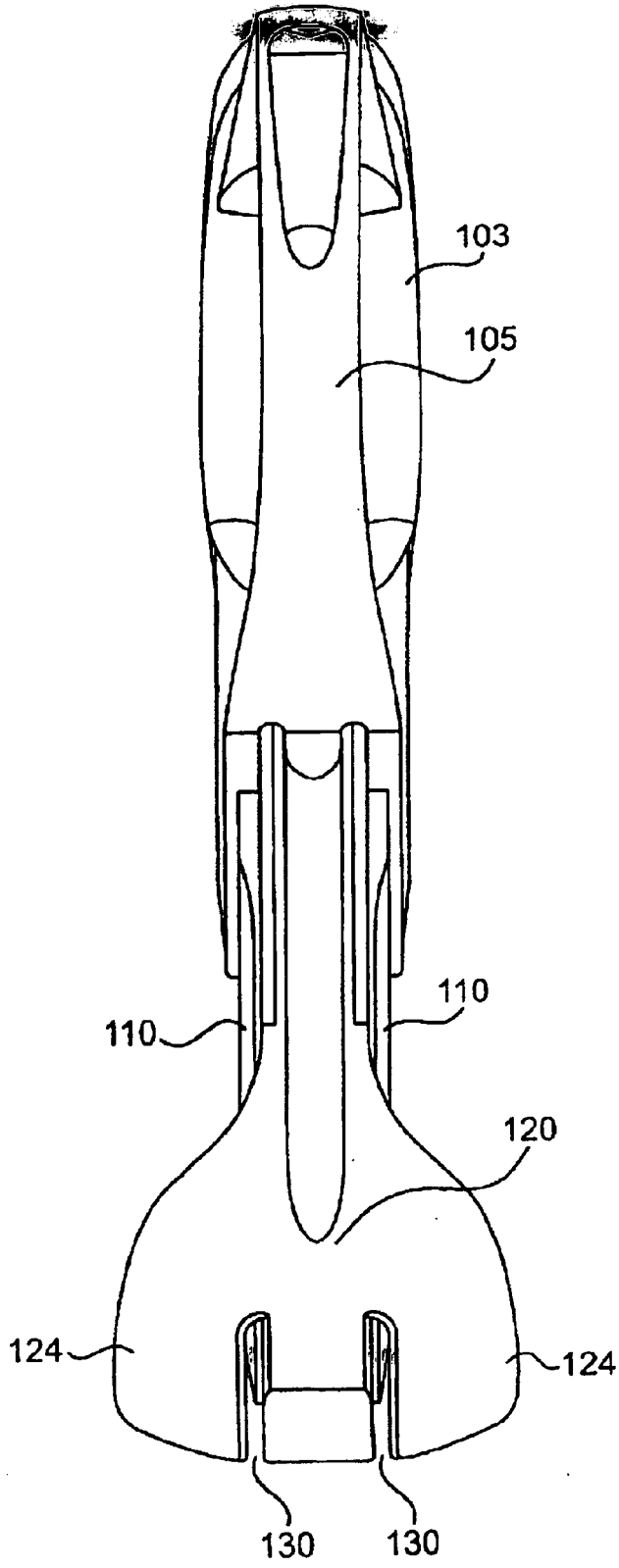
FIG. 5 is a bottom view of the cutting device shown in FIG. 1.

Extending out from rib 120 at the edges of scooping blades 122, opposite cutting edges 126, are wings 124. As shown in FIG. 5, wings 124 are integrated with rib 120, forming one continuous member. Wings 124 extend out from rib 120 along portions thereof extending from the tip of rib 120 opposite pin 101, back toward a position before pin 120. The wings extend out from rib 120 in directions substantially perpendicular to the plane of rotation of rib 120. In addition, wings 124 are curved in the direction of curvature of the face of rib 120 to have concave leading surfaces as the rib 120 is rotated toward cutting blades 110, to a closed position (shown in FIG. 3).

Further, wings 124 are curved in directions transverse to the length of rib 120. Specifically, as wings 124 extend out from rib 120, wings 124 curve in a direction toward cutting blades 110. Thus, wings 124 resemble the sides of a spoon.

Figure 3:
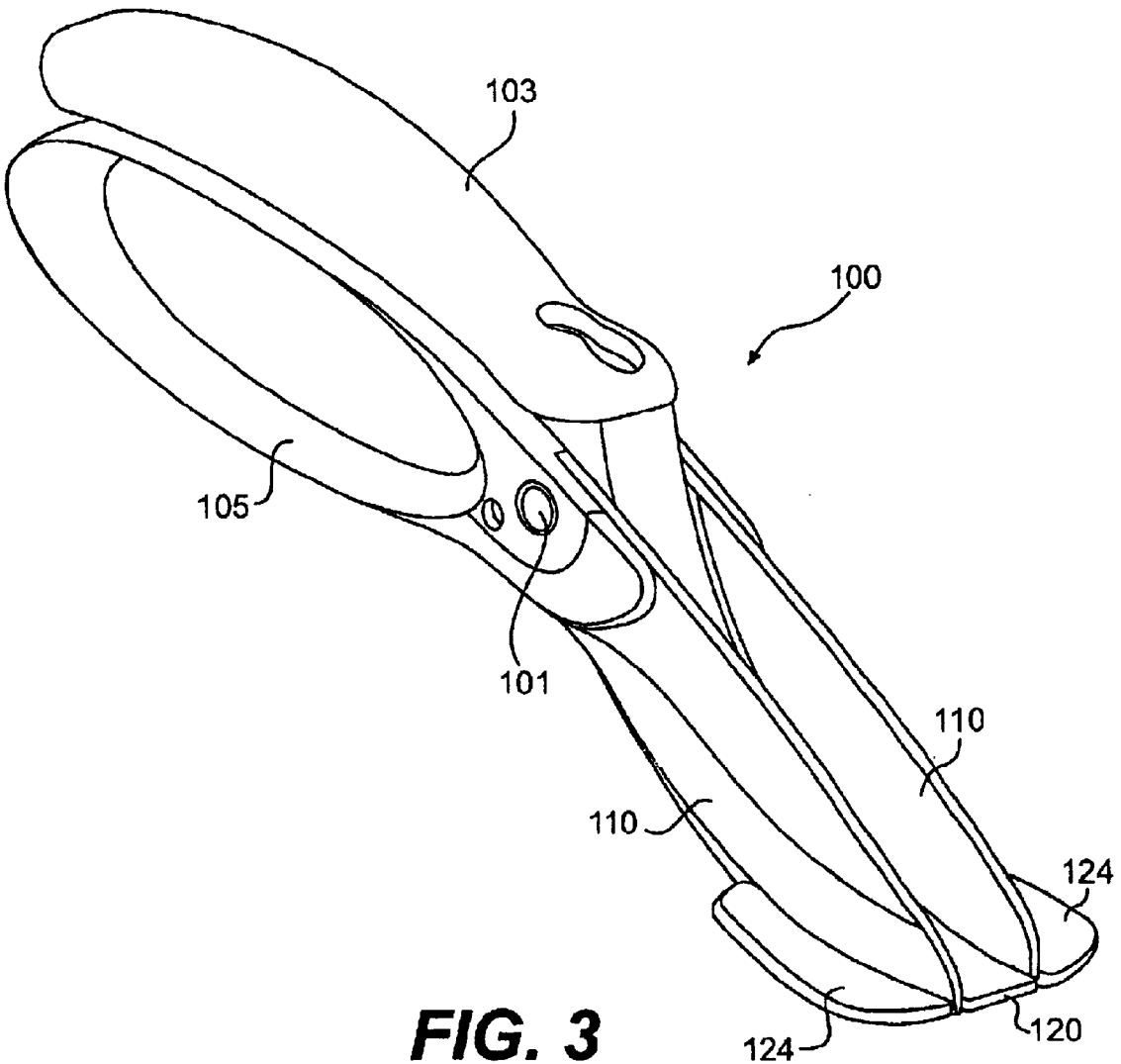
FIG. 3 is a perspective view of the cutting device shown in FIG. 1, in a closed position.

FIG. 1 shows the cutting device 100 in an open position. As a user squeezes handles 103 and 105 together, the cutting device 100 is moved to a closed position, as shown in FIG. 3. When moved from the open to closed position, cutting blades 110 and rib 120 are caused to rotate in their respective planes of rotation about the axis defined by pin 101. Accordingly, wings 124 and scooping blades 122 also rotate in their planes of rotation.

As blades 110 move to the closed position, cutting edges 112 cross concave edges 126 in substantially the same planes of rotation, respectively, in a manner similar to two pairs of scissors working in parallel, gang fashion. However, the actual cutting is one direction for each cutting blade 110, like that of a paper cutter, with each cutting blade 110 cutting food away from rib 120. Accordingly, cutting edges 112 and concave edges 126 contact each other, or come into close proximity to each other so as to cut materials positioned between those edges.

In the fully closed position, cutting blades 110 and scooping blades 122 overlap each other as viewed in directions perpendicular to their planes of rotation. Also, in the fully closed position, handles 103 and 105 abut each other so as to stop the movement of cutting blades 110 and rib 120. Thus, in the closed position, cutting blades 110 abut or come in close proximity to wings 124.

Figure 4:
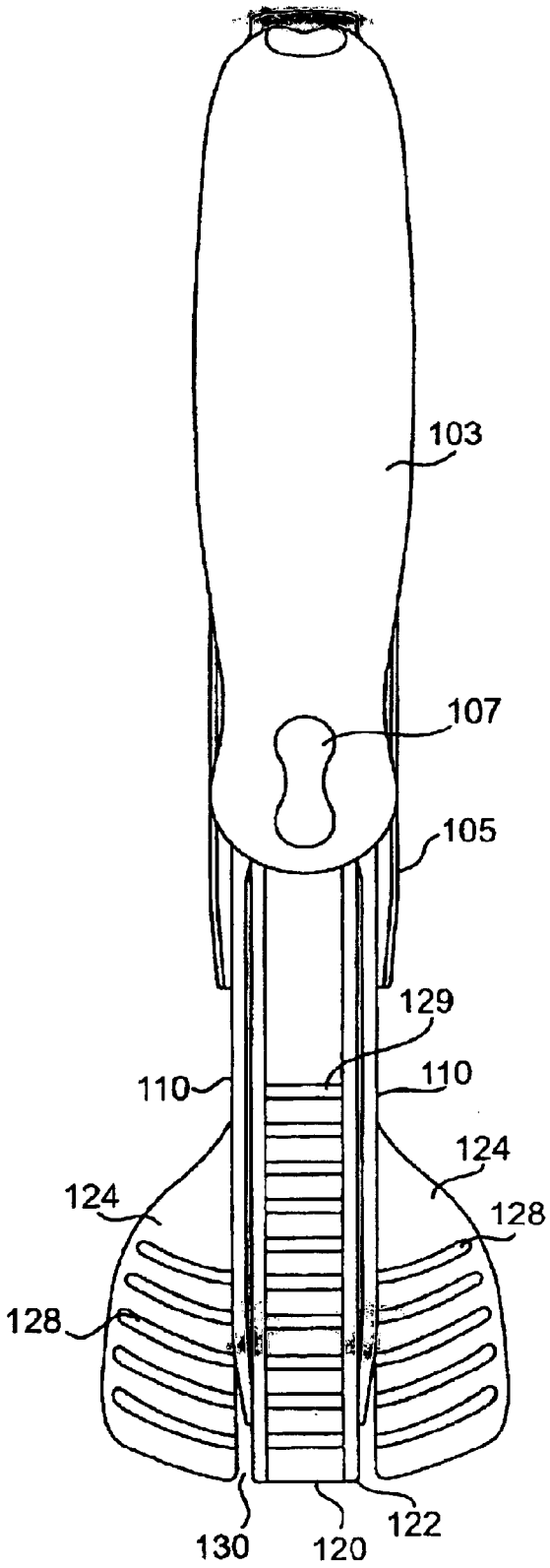
FIG. 4 is a top view of the cutting device shown in FIG. 1.

As shown in FIGS. 4 and 5, gaps 130 are formed between portions of wings 124 and rib 120. Gaps 130 extend from the tip of rib 120 in toward the axis of rotation. In the closed position, portions of cutting blades 110 are positioned in gaps 130, thus allowing the tips of cutting blades 110 to complete cutting without abutting wings 124.

From the closed position, handles 103 and 105 are biased to the open position by an internal compression spring [(not shown)] *108* (*shown in FIG. 2*). However, the handles 103 and 105 may be locked in the closed position by depressing lock 107, shown in FIGS. 1 and 4.

As shown in FIG. 4, rib 120 has raised ridges 129 formed on the concave face thereof. Ridges 129 extend across the concave face of rib 120 in directions perpendicular to the plane of rotation of rib 120. In addition, wings 124 include grooves/indentations 128 on the leading surfaces of wings 124 as they moved from the open position to the closed position. Grooves 128 extend along the faces of wings 124 and out from rib 120 in directions substantially perpendicular to the planes of rotation of wings 124.

Figure 6A:
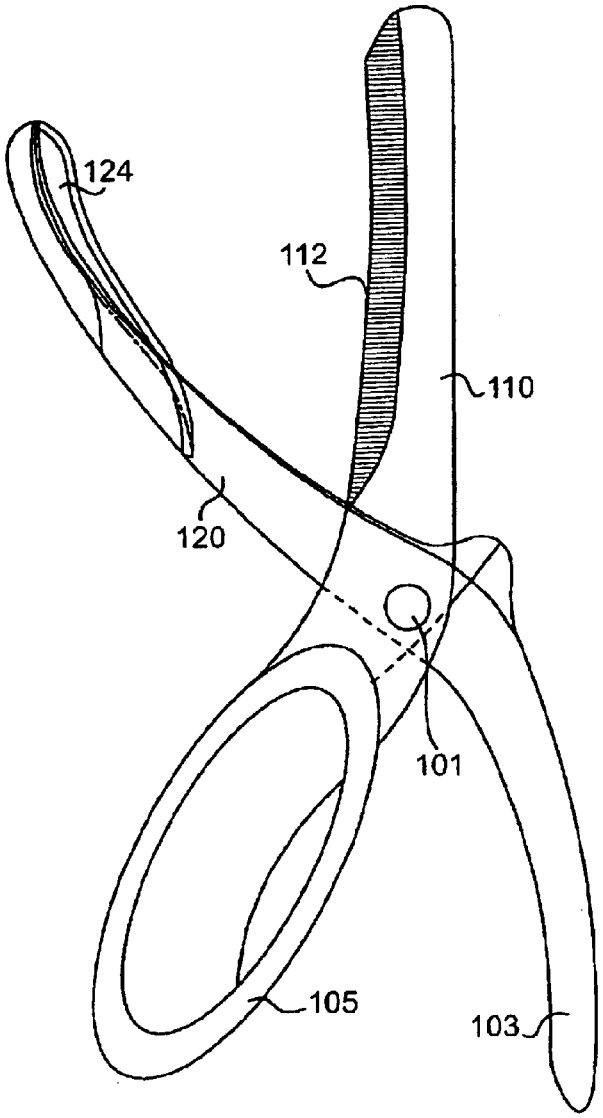
FIGS. 6a and 6b show a side view and a top view, respectively, of a cutting device of another embodiment of the present invention.
Figure 6B:
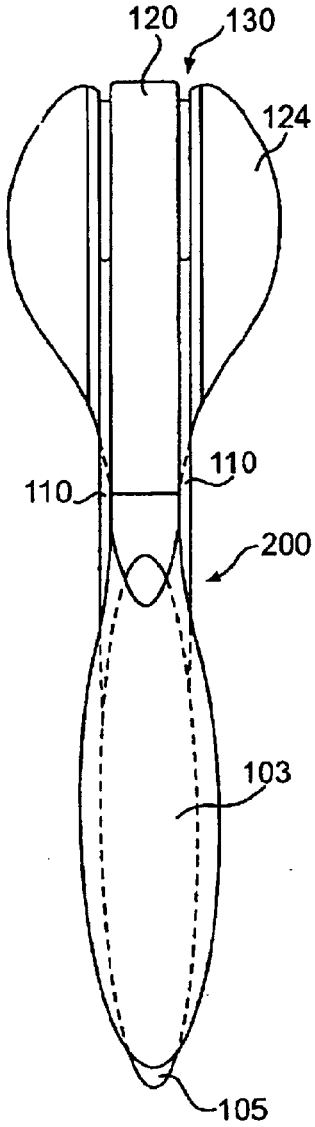

FIGS. 6a and 6b show another embodiment of the cutting device of the present invention. Much of the design is the same as in the device described above with respect to FIGS. 1–5. Accordingly, similar features are labelled with the same reference numbers, and detailed descriptions of those features are not repeated.

The cutting device 200 in FIG. 6a includes cutting blades 110 with cutting edges 112. However, cutting edges 112 are concave and serrated. Accordingly, concave cutting edges 112 are the leading edges of cutting blades 110 as the cutting device 200 is moved to the closed position.

In addition, wings 124 of cutting device 200 are more rounded at their peripheries then wings 124 of cutting device 100.

Figure 7A:
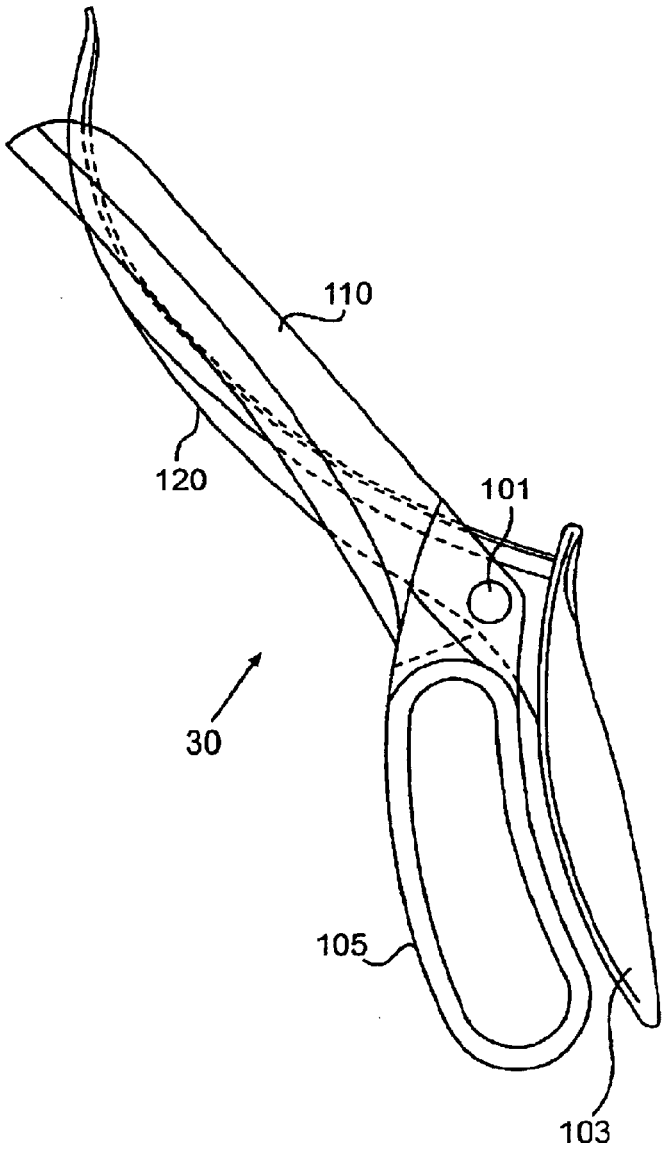
FIGS. 7a and 7b show a side view and a top view, respectively, of a cutting device of another embodiment of the present invention.
Figure 7B:
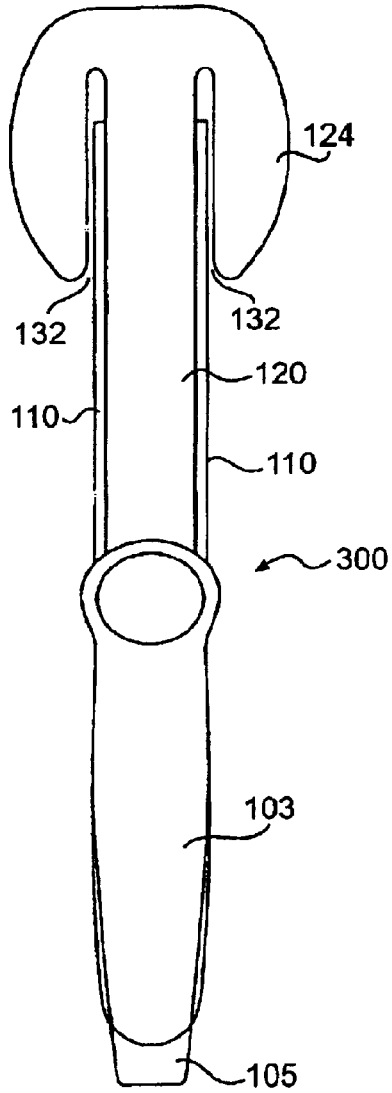

FIGS. 7a and 7b show another design of a cutting device of the present invention. Cutting device 300 is generally similar to cutting device 200. Accordingly, the same reference numbers are used to indicate similar structure and detailed descriptions thereof are not repeated.

However, there are two primary differences between cutting devices 200 and 300. First, cutting device 300 includes a rib 120 having a greater curvature than rib 120 of cutting device 200. Second, wings 124 include gap 132, which is positioned differently than gap 130 shown in FIGS. 1–6b.

Wings 124 of cutting device 300 are connected to rib 120 at portions of rib 120 most distal to the axis of rotation defined by pin 101. Specifically, wings 124 extend out from rib 120 at a position closest to the tip of rib 120, and in directions substantially perpendicular to the plane of rotation of rib 120. Spaced from rib 120, wings 124 have an L-shaped bend at which wings 124 bend so as to extend in directions parallel to rib 120 and toward pin 101. Thus, wings 124 resemble prongs extending from the tip of rib 120 toward handles 103 and 105. Gaps 132 are formed between wings 124 and rib 120 beginning at the tips of wings 124 and extending back to the bend in wings 124 at which point they connect to rib 120.

Cutting blades 110 are of a length so that they pass through gaps 132 when moved to the closed position, but do not contact the portions of wings 124 connecting to rib 120.

Figure 8A:
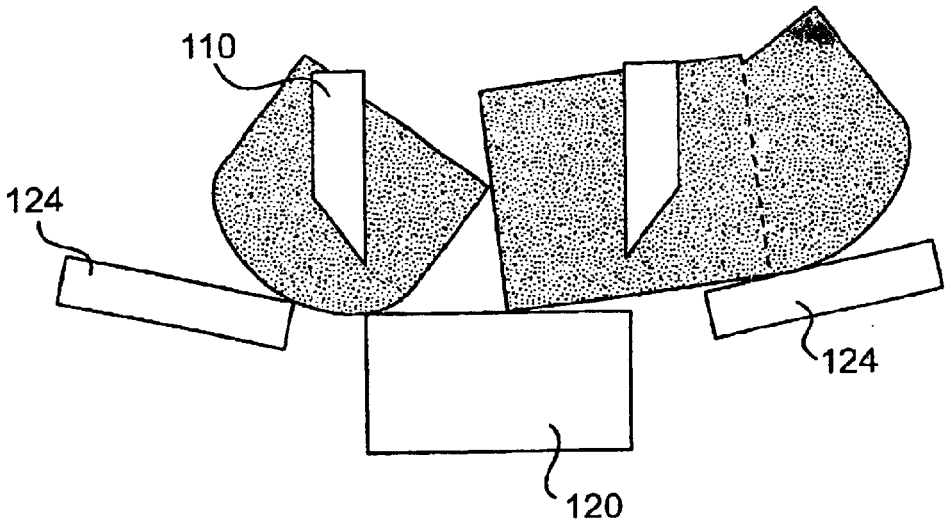
FIGS. 8a and 8b schematically depict the cutting action of cutting devices of different embodiments of the present invention.
Figure 8B:
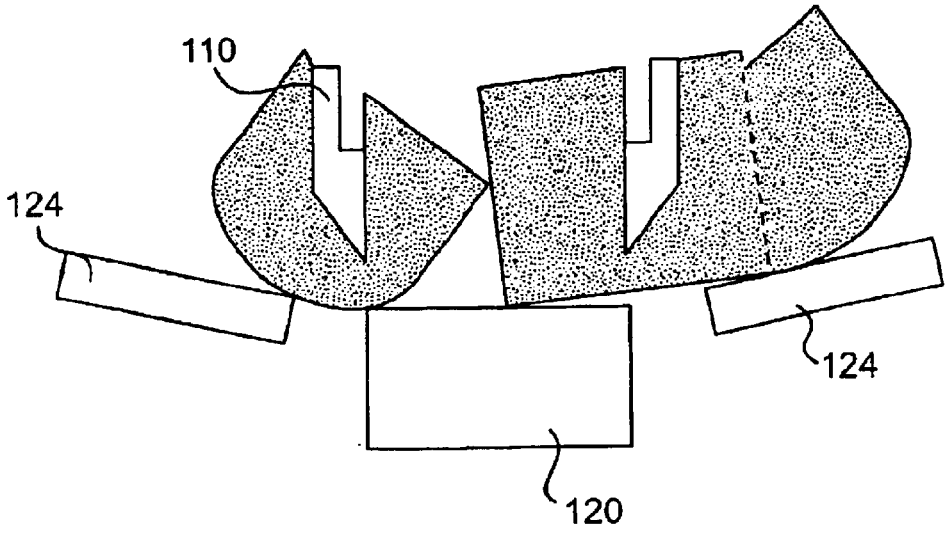

FIG. 8a is a schematic representation of how cutting devices 100–300 would typically perform cutting of food, as viewed along a length of the device. Specifically, cutting blades 110 cut through food as the food is supported by/braced against rib 120 and wings 124. FIG. 8b is similar to FIG. 8a, but the cutting blades 110 have narrower portions 110a distal to the cutting edges. Accordingly, as food is forced towards narrower portions 110a by rib 120, the food pieces have more room between adjacent cutting blades 110, so the food pieces are less likely to become wedged between cutting blades 110. While the change between the main width of cutting blades 110 and narrower portions 11a is step shaped, on other embodiments the changes may be more gradual.

FIGS. 9–13 show yet another embodiment of the present invention in which only blades are used in the cutting device (i.e., no rib or wings).

Figure 9:
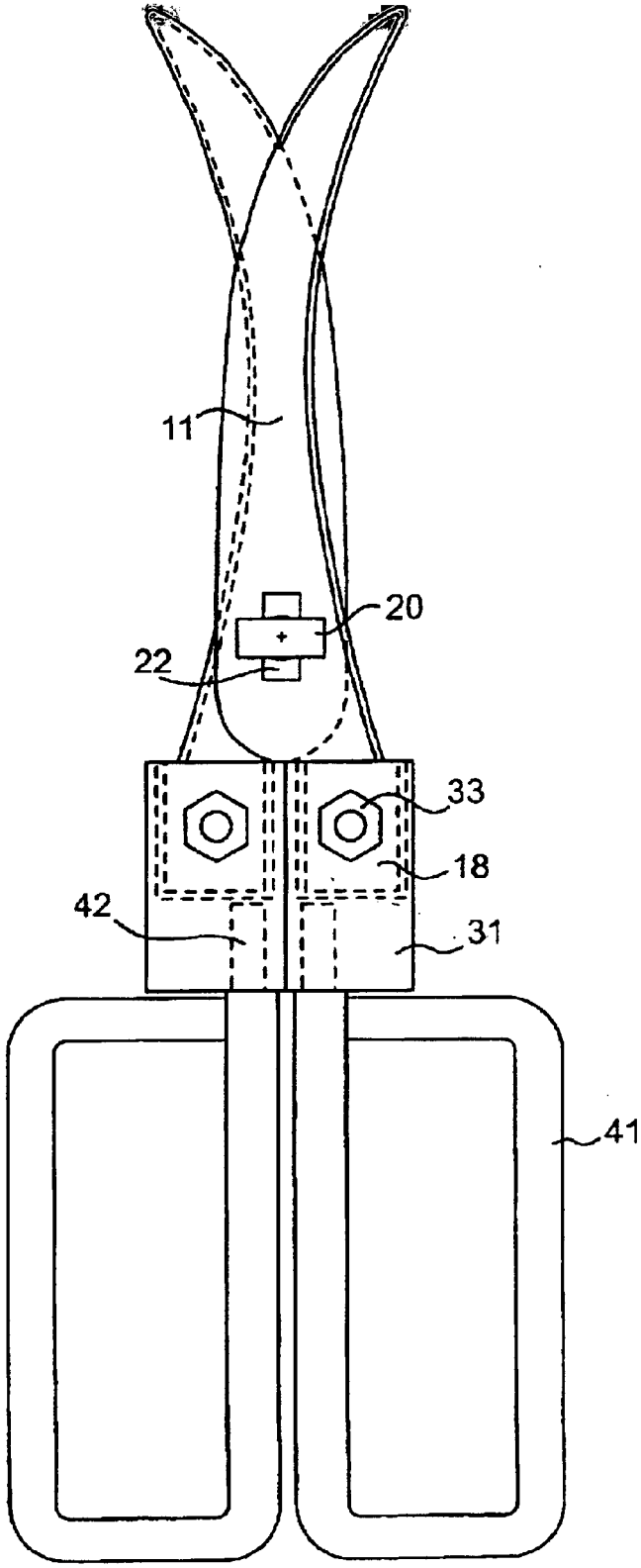
FIG. 9 is a side view of a cutting device of another embodiment of the present invention, in a closed position.
Figure 10:
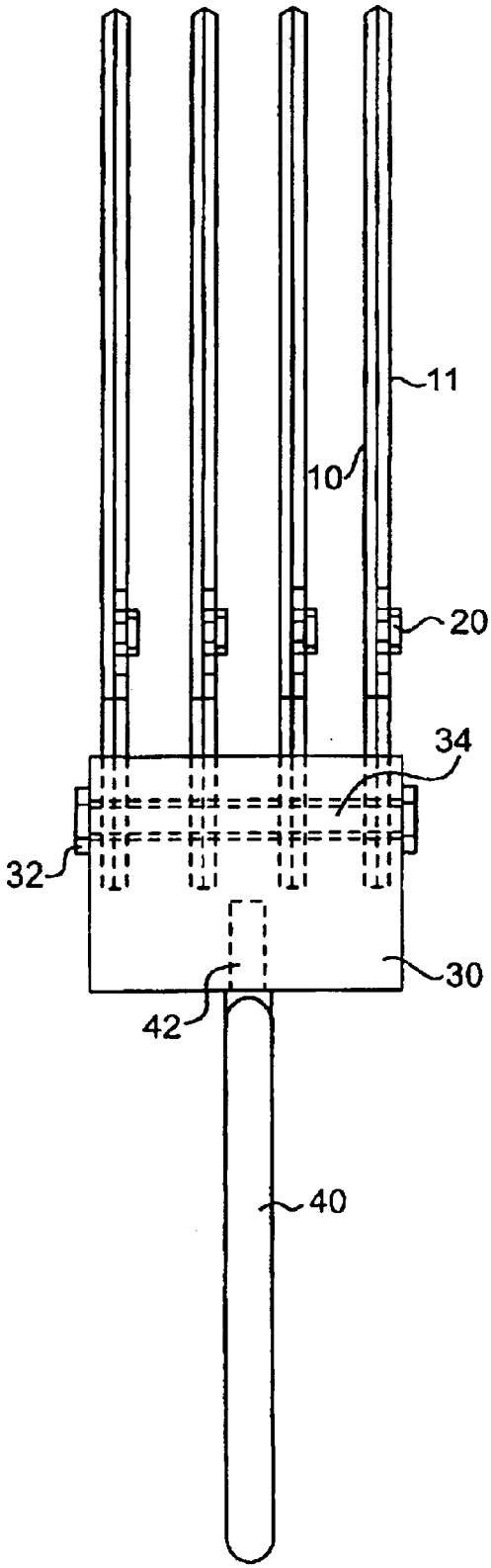
FIG. 10 is a top view of the cutting device shown in FIG. 9.

The cutting device 1 illustrated in FIGS. 9–13 includes four pairs of blades with each pair including blades 10 and 11, as shown in FIGS. 9 and 10. Each blade 10 is connected to blade 11 at a common pivot point by a 90° male/female quick release hinge. The hinge includes a head 20 projecting from blade 10 by means of a neck (not shown), and an opening 22 at the pivot point in blade 11, through which the neck and head 20 passes when aligned with the opening 22. As blades 10, 11 move to a closed position, shown in FIG. 9, the head 20 pivots so that it is no longer aligned with the opening 22, thus preventing the separation of the blades 10, 11. The blades 10, 11 of all of the pairs rotate about a common axis at their respective pivot points.

Figure 12:
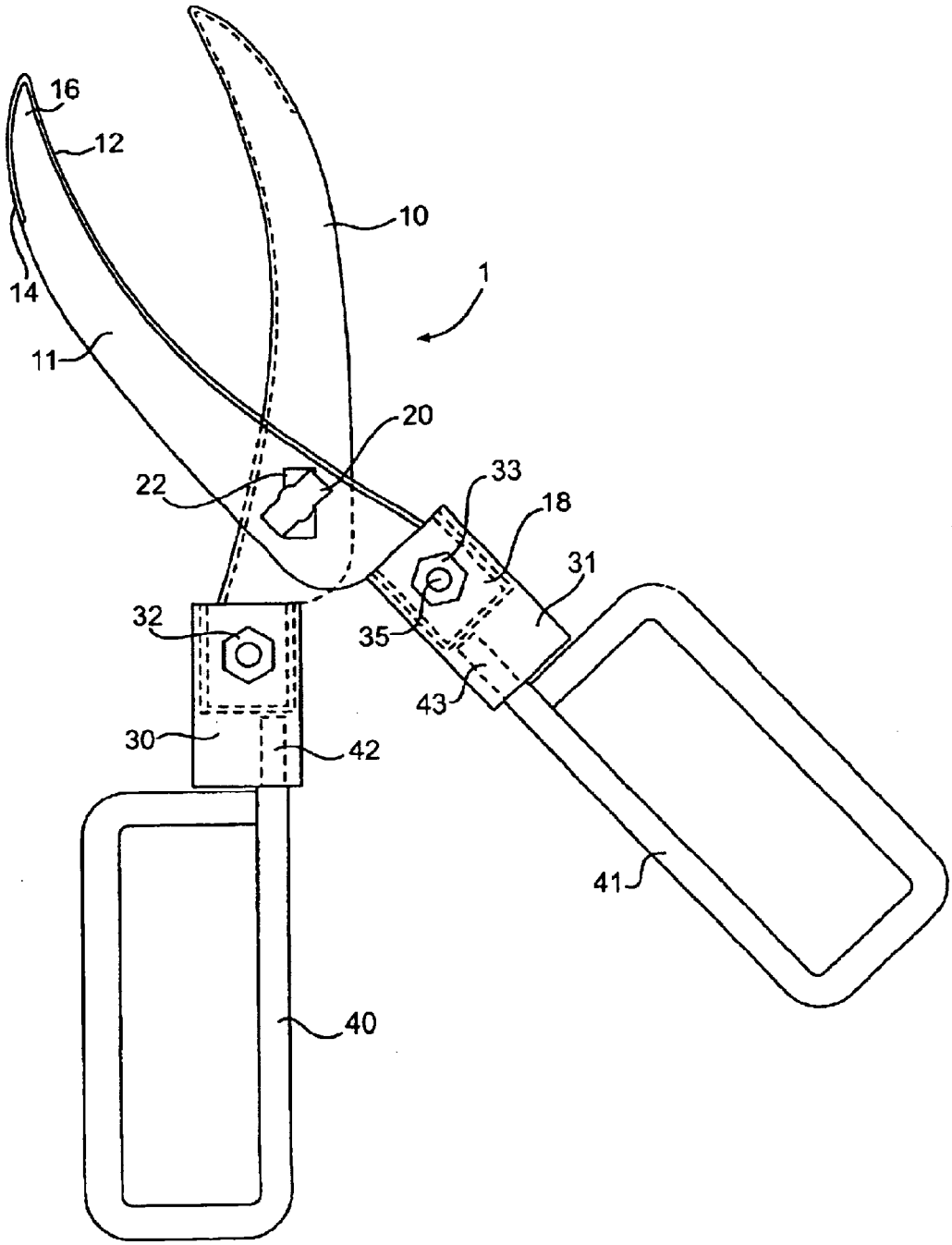
FIG. 12 is a side view of the cutting device shown in FIG. 9, in an open position.

The blades 10, 11 each have a convex edge and a concave edge. As seen in FIGS. 9 and 12 the blades 10, 11 are curved in opposite directions in their common plane of rotation. Each of the blades 10, 11 includes a cutting edge 12 along the entire length of the concave side, and a convex cutting edge 14 on the convex side at a tip portion 16 of the blade. As the blades 10, 11 move from an open position to a closed position, the cutting edges 12 of each blade crisscross. In a fully closed position, the tip portion 16 of the blades of a pair crisscross, as shown in FIG. 9, so that their travel arcs overlap, and the convex edges of the tip portions 16 are exposed along the length of the convex cutting edges 14 of each blade.

The multi-blade cutting device 1 of this embodiment provides cutting force as the concave cutting edges 12 crisscross when the blades 10, 11 move from the open to the closed position, and as the convex cutting edges 14 crisscross when blades 10, 11 move from the closed position to the open position.

Figure 11:
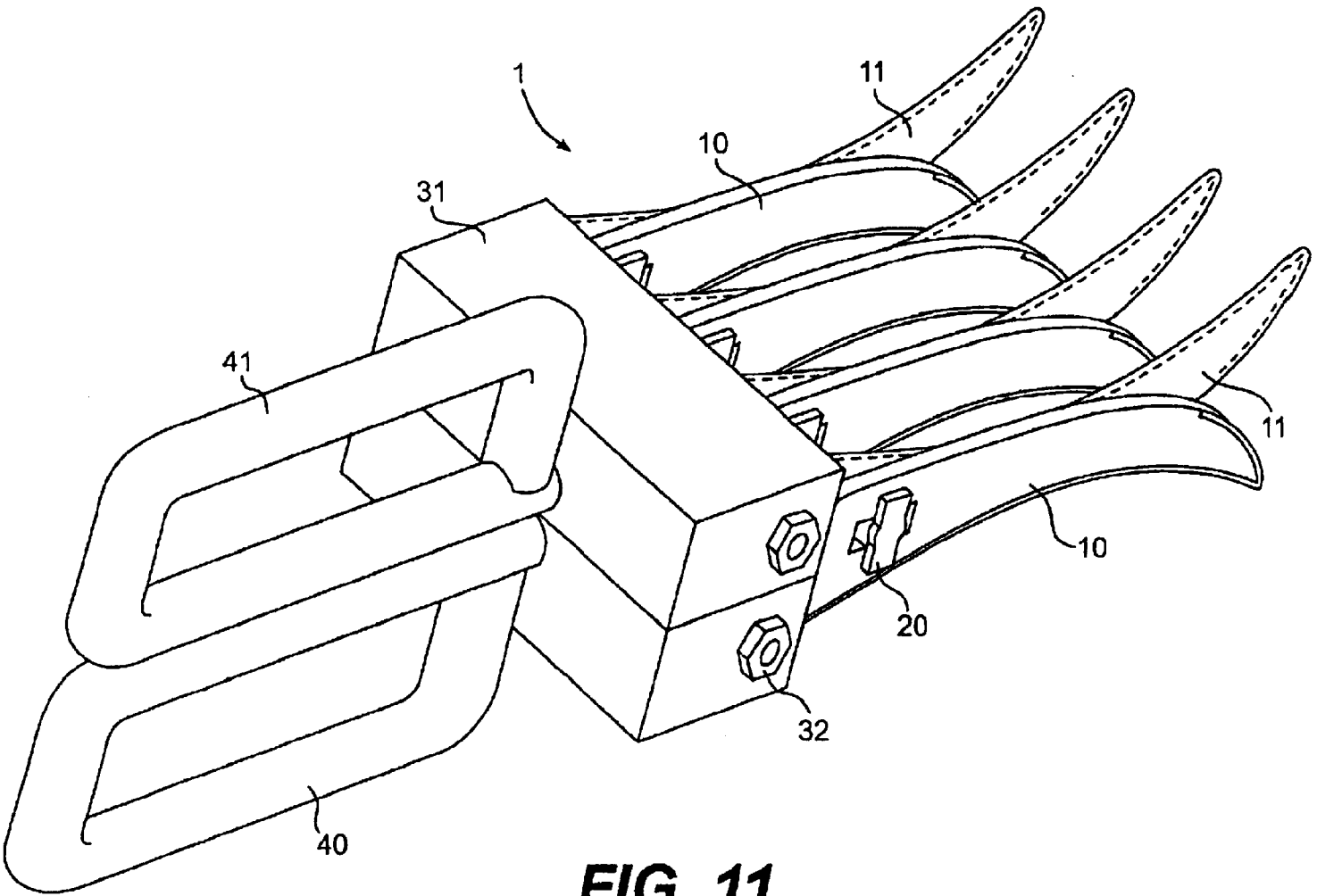
FIG. 11 is a perspective view of the cutting device shown in FIG. 9, in a closed position.

The blades 10, 11 each include a base portion 18. The base portions 18 of each pair of blades are secured in opposing solid block casings 30, 31. As seen in FIGS. 11 and 12, the base portions 18 of the blades 11 are secured in casing 31, and the base portions 18 of blades 10 are secured in casing 30.

The base portions 18 of blades 10, 11 are all secured within cavities formed in the casings 30, 31 in the same fashion. With respect to the blades 10, FIG. 10 shows a bolt 34 extends through a cavity formed in casing 30 and passes through the base portions 18 of all of the blades 10. The bolt 34 is secured to casing 30 with nut 32, such that the base portions 18 of blades 10 are securely fixed within and to the casing 30. Base portions 18 of blades 11 are secured within casing 31 in a similar manner by a separate bolt 35 and nut 33 arrangement (not shown).

Handles 40, 41 extend from the sides of casing 30, 51 that are opposite blades 10, 11, respectively, as shown in FIGS. 11 and 12. Handles 40, 41 include projections 42, 43, respectively, that are co-extensive with the handles 40, 41 and are anchored within cavities formed in casings 30, 31. Thus constructed, the movement of the handles 40, 41 controls the movement of the casings 30, 31, and hence the cutting action of the blades 10, 11.

Figure 13:
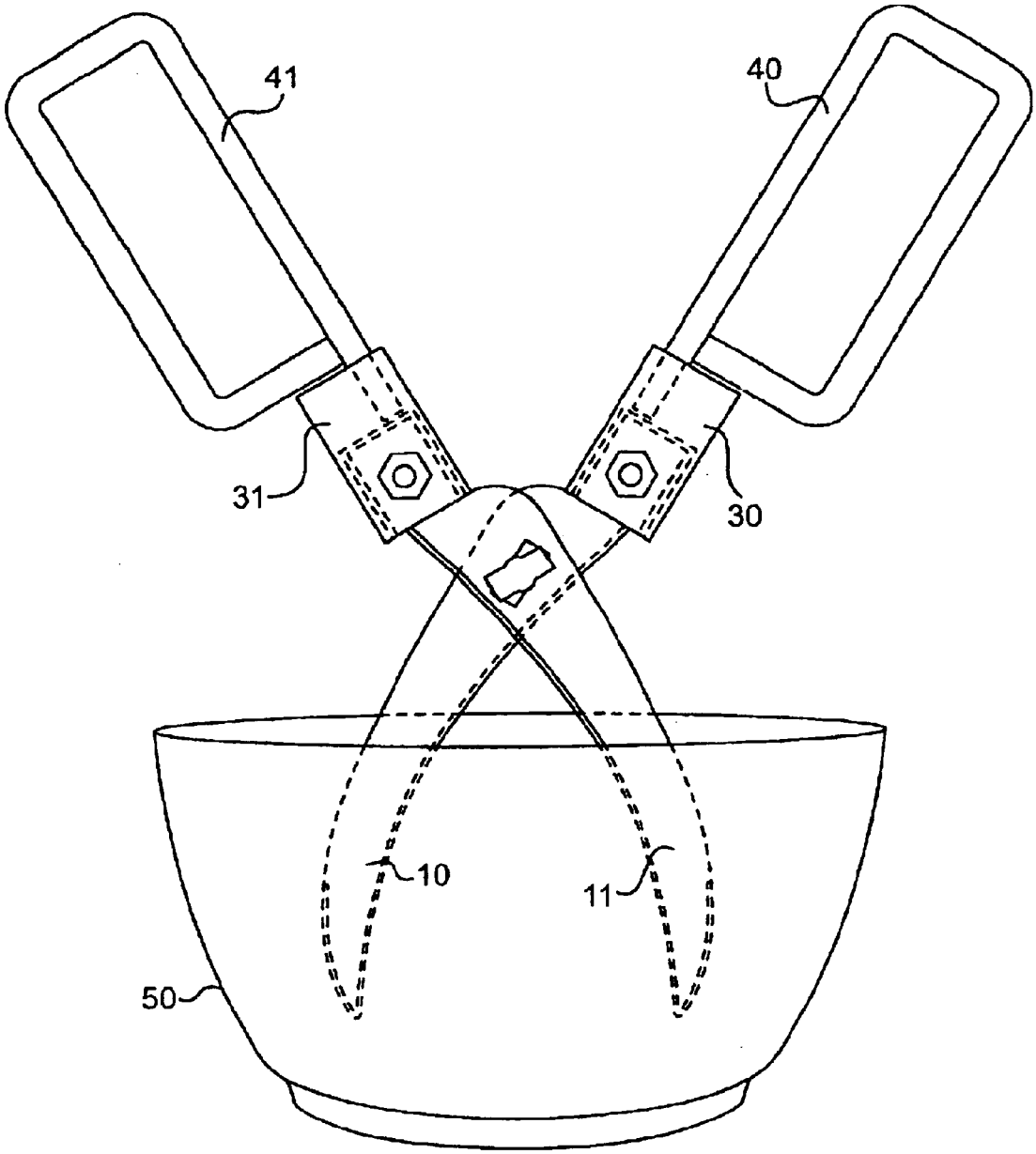
FIG. 13 is a side view of the cutting device shown in FIG. 9, in an open position and with its blades positioned within a bowl.

FIG. 13 shows the multi-blade cutting device of this embodiment opening in a bowl 50. The blades 10, 11 mimic the shape of the bowl 50, which maximizes the ability of the blades to scoop and chop food contained in the bowl 50.

Figure 14:
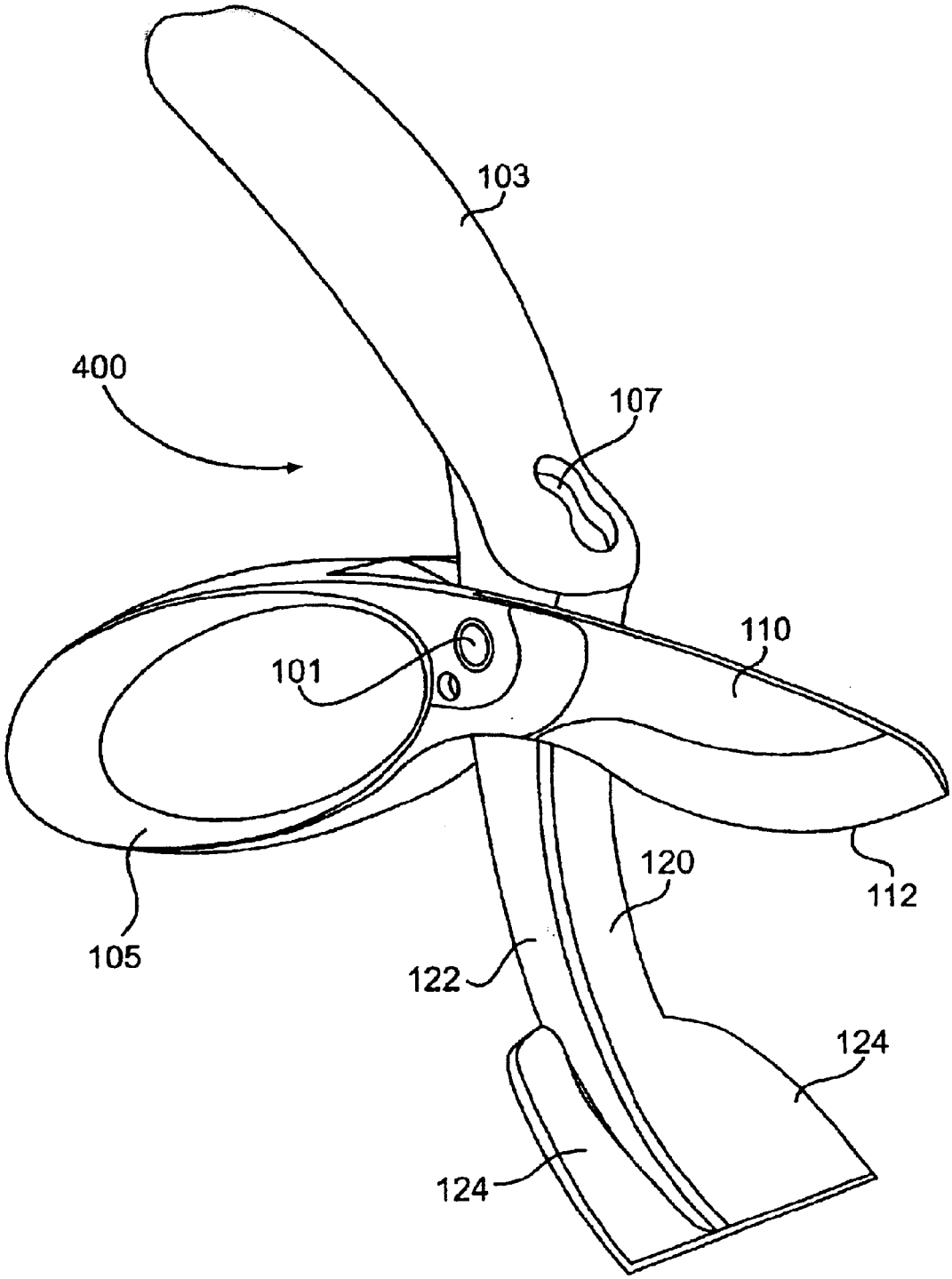
FIG. 14 is a perspective view of a cutting device of another embodiment of the present invention.

FIG. 14 shows another design of the present invention, having a cutting device 400 that is similar to cutting device 100, depicted in FIGS. 1–5. Accordingly, the same reference number indicate similar features, and a detailed description thereof is not repeated.

The main difference between cutting device 400 and cutting device 100 is that the cutting unit includes only one cutting blade 110 and the scooping unit includes only one scooping blade 122, with one concave edge 126. Thus, cutting is only performed by the interaction of cutting blade 110 and concave edge 126 of rib 120, which is integrated with wing 124 opposite concave edge 126 so as not to include a second concave edge 126. The remainder of the design and function of cutting device 400 is similar to that set forth above with respect to cutting device 100.

Variations of the above-discussed embodiments may be used while keeping with the intended scope of the invention. In addition, features of the different embodiments may be interchanged or combined to achieve alternative designs.

We claim:

1. Hand-operated kitchen shears comprising:

two blades inter-secured to rotate together about a common axis and spaced apart from each other along the common axis;

a rib pivotably secured to said two blades so as to rotate about an axis that is substantially the same as the common axis, said rib being curved in a direction of rotation so as to have a concave surface;

handles integrated with said two blades and said rib to control said two blades and said rib to rotate simultaneously between opened and closed positions, wherein the concave surface of said rib is the lead surface when moving from the open position to the closed position, and cutting edges of said two blades cross opposing edges along the length of the concave surface when moving from the open position to the closed position so as to perform a cutting action against the opposing edges.

2. The hand-operated kitchen shears according to claim 1, wherein the concave surface of said rib has ridges formed thereon, said ridges extending in directions substantially perpendicular to the plane of rotation of said rib.

3. The hand-operated kitchen shears according to claim 1, wherein said rib comprises rib blades secured to the sides thereof so as to form the *opposing* edges along the length of the concave surface, and the cutting edges of said two blades cross concave edges of said rib blades when moving from the open position to the closed position so as to perform a cutting action against the concave edges of said rib blades.

4. The hand-operated kitchen shears according to claim 1, further comprising a pair of wings secured so as to rotate with said rib, said wings extending from opposite sides of said rib in directions substantially perpendicular to the plane of rotation of said rib.

5. The hand-operated kitchen shears according to claim 4, wherein said wings extend from said rib at positions adjacent edges of said rib opposite the concave surface.

6. The hand-operated kitchen shears according to claim 5, wherein said wings extend out from said rib along a length of said rib in the range of about 3.5 to about 6.5 cm.

7. The hand-operated kitchen shears according to claim 4, wherein said wings extend from positions proximate to edges of said rib opposite the concave surface, a space is provided between said wings and said rib along portions of said rib and wings extending from the end of said rib opposite the axis of rotation inward, and tips of said blades pass between said wings and said rib at the spaces when moved to the closed position.

8. The hand-operated kitchen shears according to claim 4, wherein, from a position closest to said rib outward in directions substantially perpendicular to the plane of rotation of said rib, said wings slope toward a direction of movement of said rib from the open position to the closed position.

9. The hand-operated kitchen shears according to claim 1, further comprising a spring mechanism that biases said rib and said blades to the open position.

10. The hand-operated kitchen shears according to claim 1, wherein said blades [are curved in their planes of rotation in a direction opposite the direction of curvature of] *and* the concave surface of said rib *have curvatures that complement each other*.

11. The hand-operated kitchen shears according to claim 1, wherein a distance between said two blades at equal relative positions on the cutting edges is smaller than the distance between said two blades at equal relative positions on said two blades at positions closer to edges of said two blades opposite the cutting edges.

12. Hand-operated kitchen shears comprising:

a plurality of pairs of blades pivotably inter-secured to rotate about substantially the same axis, each one of said pairs of blades including a first blade and a second blade having a substantially common plane of rotation, said first blades being curved in their respective planes of rotation to have concave cutting edges;

a pair of wings secured so as to rotate with said first blades, said wings extending in opposite directions from different outermost first blades along the axis of rotation; and two handles integrated with said plurality of pairs of blades to control said first and second blades of each one of said plurality of pairs of blades to simultaneously rotate between opened and closed positions, wherein the concave cutting edges of said first blades are lead edges as said plurality of pairs of blades are rotated from the open to closed position.

13. The hand-operated kitchen shears according to claim 12, wherein said wings extend from said first blades at positions at or adjacent edges of said first blades opposite the concave *cutting* edges.

14. The hand-operated kitchen shears according to claim 13, wherein said wings extend out from said first blades along a length in the range of about 3.5 to about 6.5 cm.

15. The hand-operated kitchen shears according to claim 12, wherein, in directions substantially perpendicular to the plane of rotation of said first blades, portions of said wings are spaced from said first blades along portions of said first blades extending from the end of said first blades opposite the axis of rotation toward the axis of rotation, and tips of said second blades pass between said wings and said first blades at the spaces.

16. The hand-operated kitchen shears according to claim 12, further comprising a spring mechanism that biases said first and second blades to the open position.

17. The hand-operated kitchen shears according to claim 12, wherein cutting edges of said second blades [are curved in their planes of rotation in directions opposite that of the curvature of said] *and* cutting edges of said first blades *are curved in respective planes of rotation to complement each other*.

18. The hand-operated kitchen shears according to claim 12, wherein, from a position closest to said respective first blades outward in directions substantially perpendicular the plane of rotation of said first blades, said wings slope in a direction of movement from the open position to the closed position.

19. The hand-operated kitchen shears according to claim 11, further comprising a rib positioned between an innermost two of said first blades and secured to said device so as to rotate with said first blades, said rib being curved in the same direction as said first blades so as to have a concave surface.

20. The hand-operated kitchen shears according to claim 19, wherein said innermost two first blades are secured flush against opposing sides of said rib.

21. The hand-operated kitchen shears according to claim 11, wherein an innermost two first blades are secured to each other so as to form a rib, said rib having a concave surface bounded by said concave cutting edges of said innermost two first blades.

22. Hand-operated kitchen shears comprising:

a first blade secured to said device so as to rotate about an axis, said first blade having a cutting edge;

a scoop secured to said device so as to rotate about an axis that is substantially the same as the axis of rotation of said first blade, said scoop having (a) a concave scooping surface opposing a cutting edge of said first blade and (b) a second cutting blade secured [to] *on* the scooping surface, *the second cutting blade having a concave cutting edge*; and handles integrated with said first blade and said scoop to control said first blade and said scoop, including the second blade, to simultaneously rotate between open and closed positions, wherein (a) [a] *the concave* cutting edge of the second blade of said scoop is a lead edge when moving from the open position to the closed position, (b) the second blade's cutting edge and the first blade's cutting edge cross so as to perform a cutting action when moving from the open position to the closed position, and (c) said scoop supports the second blade so as to prevent the second blade from contacting surfaces positioned below said scoop.

23. The hand-operated kitchen shears according to claim 22, wherein the concave scooping surface is curved in directions both perpendicular to and parallel with [a] *the* plane of rotation of said first blade.

24. The hand-operated kitchen shears according to claim 23, wherein the concave scooping surface has ridges formed thereon, the ridges extending in directions substantially perpendicular to the plane of rotation of said first blade.

25. The hand-operated kitchen shears according to claim 23, further comprising a spring mechanism that biases said scoop and said first blade to the open position.

26. The hand-operated kitchen shears according to claim 23, wherein [the cutting edge of the second blade is curved in its plane of rotation in a direction opposite that of the curvature of the cutting edge of said first blade] *the cutting edge of the first blade is curved convexly in its plane of rotation.*

27. Hand-operated kitchen shears comprising:

a blade secured to said device so as to rotate about an axis, said blade having a cutting edge;

a scoop secured to said device so as to rotate about an axis that is substantially the same as the axis of rotation of said blade, said scoop having (a) a concave scooping surface opposing a cutting edge of said blade, with the concave scooping surface being curved [in directions both perpendicular to and parallel with a] *to define a curvature that extends both within and transverse to the* plane of rotation of said blade, and (b) a cutting blade formed on the scooping surface; and handles integrated with said blade and said scoop to control said blade and said scoop, including the cutting edge, to simultaneously rotate between open and closed positions, wherein the cutting edge of said scoop (a) is a lead edge when moving from the open position to the closed position and (b) crosses the blade's cutting edge so as to perform a cutting action when moving from the open position to the closed position.

28. Hand-operated kitchen shears comprising:

a blade secured to said device so as to rotate about an axis, said blade having a cutting edge;

a scoop secured to said device so as to rotate about an axis that is substantially the same as the axis of rotation of said blade, said scoop having (a) a concave scooping surface opposing a cutting edge of said blade, and (b) a cutting edge formed on the scooping surface, [the radius of curvature of] the *scooping surface* cutting edge [at a most severe curve of the cutting edge being in the range of] *having* about 30 to 90 degrees *of arc*; and handles integrated with said blade and said scoop to control said blade and said scoop, including the cutting edge, to simultaneously rotate between open and closed positions, wherein the cutting edge of said scoop is (a) a lead edge when moving from the open position to the closed position and (b) crosses the blade's cutting edge so as to perform a cutting action when moving from the open position to the closed position.

29. Hand-operated kitchen shears comprising:

a blade secured to said device so as to rotate about an axis, said blade having a cutting edge;

a scoop secured to said device so as to rotate about an axis that is substantially the same as the axis of rotation of said blade, said scoop having (a) a concave scooping surface opposing a cutting edge of said blade, and (b) a cutting edge formed on the scooping surface; and handles integrated with said blade and said scoop to control said blade and said scoop, including the cutting edge, to simultaneously rotate between open and closed positions, wherein the cutting edge of said scoop (a) is positioned away from a lengthwise edge of said scoop, toward the center of said scoop, (b) is a lead edge when moving from the open position to the closed position and (c) crosses the blade's cutting edge so as to perform a cutting action when moving from the open position to the closed position.

30. Hand-operated kitchen shears comprising:

a blade secured to said device so as to rotate about an axis, said blade having a cutting edge;

a scoop secured to said device so as to rotate about an axis that is substantially the same as the axis of rotation of said blade, said scoop having (a) a concave scooping surface opposing a cutting edge of said blade and (b) a cutting edge formed on the scooping surface; and handles integrated with said blade and said scoop to control said blade and said scoop, including the cutting edge, to simultaneously rotate between open and closed positions, wherein (a) the cutting edge of said scoop is a lead edge when moving from the open position to the closed position, (b) the scoop's cutting edge and the blade's cutting edge cross so as to perform a cutting action when moving from the open position to the closed position and (c) the curvature of said blade substantially machines the curvature of said scoop along the length of the scoop, and (d) the scoop's cutting edge is a concave cutting edge opposing the blade's cutting edge.

*31. A hand-operated food-chopping device comprising:*

*two blades secured to rotate together in the same direction, at the same time, about a common axis and spaced apart from each other along the common axis, each blade having a cutting edge;*

*a scoop pivotably secured to the two blades so as to rotate about an axis that is substantially the same as the common axis, the scope having a concave surface; and*

*handles integrated with the two blades and the scoop to control the two blades and the scoop to rotate between open and closed positions,*

*wherein, when moving from the open position to the closed position the blades' cutting edges are the lead edges of the blades and the concave surface of the scoop is the scoop's lead surface, and wherein the concave surface is capable of supporting food such that the cutting edges of the two blades chop the food supported by the scoop when moving from the open position to the closed position.*

*32. The hand-operated food-chopping device according to claim 31, wherein the concave surface of the scoop has a curvature that extends within the plane of rotation of the scoop, and a curvature that extends transverse to the plane of rotation of the scoop.*

*33. The hand-operated food-chopping device according to claim 32, wherein the concave surface of the scoop has side edges and the plane of rotation of each of the blades intersects the concave surface along a line that is intermediate the scoop's side edges.*

*34. The hand-operated food-chopping device according to claim 33, wherein the cutting edge of each of the blades is curved in its plane of rotation and at least a portion of that curvature substantially matches the curvature of the scoop in the plane of rotation of that blade.*

*35. The hand-operated food-chopping device according to claim 34, wherein the scoop blocks the two blades from contacting surfaces positioned below the scoop.*

*36. A hand-operated food-chopping device comprising:*

*a blade secured so as to rotate about an axis of rotation, the blade having a cutting edge;*

*a food-supporting scoop secured so as to rotate about an axis that is substantially the same as the axis of rotation of the blade, the scoop having side edges and a concave surface that opposes the cutting edge of the blade, with the concave surface being curved to define a curvature that extends both within and transverse to the plane of rotation of the blade; and*

*handles integrated with the blade and the scoop to control the blade and the scoop to rotate between open and closed positions,*

*wherein (a) the concave surface of the scoop is the lead surface when moving from the open position to the closed position, (b) the blade's plane of rotation intersects the scoop along a line that is intermediate the scoop's side edges, and (c) the blade's cutting edge chops food supported by the scoop when moving from the open position to the closed position.*

*37. The hand-operated food-chopping device according to claim 36, wherein the cutting edge of the blade is curved in its plane of rotation and at least a portion of that curvature substantially matches the curvature of the scoop in the plane of rotation of the blade.*

*38. The hand-operated food-chopping device according to claim 37, wherein the scoop blocks the blade from contacting surfaces positioned below the scoop.*

*39. A hand-operated food-chopping device comprising:*

*a blade secured so as to rotate about an axis of rotation, the blade having a cutting edge;*

*a food-supporting scoop secured so as to rotate about an axis that is substantially the same as the axis of rotation of the blade, the scoop having side edges and a concave surface that opposes the cutting edge of the blade; and*

*handles integrated with the blade and the scoop to control the blade and the scoop to rotate between open and closed positions,*

*wherein (a) the concave surface of the scoop is the lead surface when moving from the open position to the closed position, (b) the blade's plane of rotation intersects the scoop along a line that is intermediate the scoop's side edges, and (c) the blade's cutting edge chops food supported by the scoop when moving from the open position to the closed position.*

*40. The hand-operated food-chopping device according to claim 39, wherein the cutting edge of the blade is curved in its plane of rotation and at least a portion of that curvature substantially matches the curvature of the scoop in the plane of rotation of the blade.*

*41. The hand-operated food-chopping device according to claim 40, wherein the scoop blocks the blade from contacting surfaces positioned below the scoop.*

*42. Hand-operated kitchen shears comprising:*

*at least one blade having a blade's cutting edge;*

*at least one opposing concave cutting edge;*

*a scoop having a concave curvature with a bottom;*

*handles integrated with the at least one blade and the scoop;*

*a pivot connection that is arranged to enable the at least one blade and the at least one opposing cutting edge to rotate about the pivot connection between open and closed positions in response to movement of the handles relative to each other so that the blade's cutting edge and the opposing cutting edge cross each other to perform a cutting action when moving from the open position to the closed position, the opposing cutting edge being between the bottom of the concave curvature and the at least one blade while the at least one blade and the at least one cutting edge are in the open position, the handles being arranged to abut each other in response to the at least one blade and the at least one opposing cutting edge reaching the closed position; and*

*a locking mechanism arranged to lock the handles while the handles abut each other in the closed position.*

*43. Hand-operated kitchen shears comprising:*

*at least one blade having a convex cutting edge;*

*a scoop having a concave surface;*

*handles;*

*a pivot connection that pivotally connects the scoop to the at least one blade and is arranged to enable the at least one blade to rotate about the pivot connection relative to the scoop between open and closed positions in response to movement of the handles relative to each other, the handles being arranged to abut each other in response to the at least one blade reaching the closed position, wherein the blade is positioned so as to chop food supported on the surface of the scoop when the blade moves to the closed position; and*

*a locking mechanism arranged to lock the handles together while the handles abut each other in the closed position.*

*44. Hand-operated kitchen shears comprising:*

*at least a pair of blades each having a respective cutting edge;*

*a scoop being elongated and having a dimension transverse to a direction of elongation of the scoop that is wider than a distance between the blades;*

*handles; and*

*a pivot connection that pivotally connects the scoop to each of the blades and is arranged to enable the at least one blade to rotate about the pivot connection relative to the scoop between open and closed positions in response to movement of the handles relative to each other.*

*45. The hand-operated kitchen shears as in claim 44, wherein the handles abut each other in response to the at least one blade and the at least one opposing cutting edge reaching the closed position.*

*46. The hand-operated kitchen shears as in claim 45, further comprising a locking mechanism arranged to lock the handles while the handles abut each other during the closed position.*

*47. The hand-operated kitchen shears of claim 1, wherein each of the two blades contacts one of the opposing edges along the concave surface of the rib when moving from the open position to the closed position.*

*48. The hand-operated kitchen shears according to claim 27, wherein the cutting edge on the scooping surface is plastic.*

*49. The hand-operated kitchen shears according to claim 48, wherein the cutting edge on the scooping surface is square with the scooping surface.*

*50. The hand-operated kitchen shears according to claim 48, wherein the cutting edge on the scooping surface is a raised portion of the scooping surface.*

*51. The hand-operated kitchen shears according to claim 48, wherein the blade contacts the cutting edge on the scooping surface when moving from the open position to the closed position.*

* * * * *